US007884855B2

(12) United States Patent
Ortiz

(10) Patent No.: US 7,884,855 B2
(45) Date of Patent: Feb. 8, 2011

(54) DISPLAYING BROADCASTS OF MULTIPLE CAMERA PERSPECTIVE RECORDINGS FROM LIVE ACTIVITIES AT ENTERTAINMENT VENUES ON REMOTE VIDEO MONITORS

(75) Inventor: Luis M. Ortiz, Albuquerque, NM (US)

(73) Assignee: Front Row Technologies, LLC, Albuquerque, NM (US)

( * ) Notice: Subject to any disclaimer, the term of this patent is extended or adjusted under 35 U.S.C. 154(b) by 0 days.

(21) Appl. No.: 12/237,629

(22) Filed: Sep. 25, 2008

(65) Prior Publication Data

US 2009/0128631 A1    May 21, 2009

Related U.S. Application Data

(63) Continuation of application No. 10/620,098, filed on Jul. 14, 2003, now Pat. No. 7,796,162, which is a continuation-in-part of application No. 09/708,776, filed on Nov. 8, 2000, now Pat. No. 7,149,549, said application No. 10/620,098 is a continuation-in-part of application No. 10/015,458, filed on Dec. 13, 2001, and a continuation-in-part of application No. 09/902,348, filed on Jul. 10, 2001, now Pat. No. 7,812,856.

(60) Provisional application No. 60/243,561, filed on Oct. 26, 2000.

(51) Int. Cl.
*H04N 5/232* (2006.01)
(52) U.S. Cl. ............... 348/211.8; 348/157; 348/208.14; 348/333.01
(58) Field of Classification Search ................. 348/143, 348/157, 169, 207.1, 208.14, 211.1–3, 211.8–11
See application file for complete search history.

(56) References Cited

U.S. PATENT DOCUMENTS 4,183,056 A    1/1980    Evans et al.

(Continued)

FOREIGN PATENT DOCUMENTS

CA      2237939      6/1998

OTHER PUBLICATIONS

Ken Salzberg et al., "Intel's Immersive Sports Vision," Intel Corporation, Mar. 30, 2001.

(Continued)

*Primary Examiner*—Gevell Selby
(74) *Attorney, Agent, or Firm*—Kermit D. Lopez; Luis M. Ortiz; Ortiz & Lopez, PLLC

(57) ABSTRACT

Broadcast methods and systems for simultaneously transmitting, processing and selectively displaying more than one video camera perspectives recorded at live entertainment venues on remote video monitors. Video recording can be from more than one entertainment venue or can be more than on synchronized video camera perspective of an activity at an entertainment venue. Remote video monitors can be venue-based hand held devices or video monitors used at home. Remote video monitors can include hand held devices and high definition televisions (e.g., HDTVs) including flat panel display screens therein. Within a venue, camera views can be processed and formatted for display on display screens associated with remote video monitor. A user can select from more than one view from video cameras that the user wants displayed on the remote viewer, enabling a user of the remote video monitor to view more than one camera view through the remote viewer at a time/simultaneously.

24 Claims, 20 Drawing Sheets

U.S. PATENT DOCUMENTS

| | | | |
|---|---|---|---|
| 4,443,387 A | 4/1984 | Gordon | |
| 4,994,909 A | 2/1991 | Graves et al. | |
| 5,164,827 A * | 11/1992 | Paff | 348/143 |
| 5,243,415 A | 9/1993 | Vance | 358/86 |
| 5,295,180 A | 3/1994 | Vendetti et al. | |
| 5,299,117 A | 3/1994 | Farnbach | |
| 5,413,345 A | 5/1995 | Nauck | 473/156 |
| 5,422,816 A | 6/1995 | Sprague et al. | |
| 5,448,291 A | 9/1995 | Wickline | 348/159 |
| 5,485,504 A | 1/1996 | Ohnsorge | 379/58 |
| 5,513,384 A | 4/1996 | Brennan et al. | |
| 5,546,538 A | 8/1996 | Cobbley et al. | |
| 5,585,850 A | 12/1996 | Schwaller | 348/388 |
| 5,598,208 A | 1/1997 | McClintock | 348/159 |
| 5,600,368 A | 2/1997 | Matthews et al. | 348/143 |
| 5,613,191 A | 3/1997 | Hylton et al. | 455/3.1 |
| 5,621,732 A | 4/1997 | Osawa | |
| 5,627,915 A | 5/1997 | Rosser et al. | 382/219 |
| 5,663,717 A | 9/1997 | DeLuca | 340/825.36 |
| 5,689,549 A | 11/1997 | Bertocci et al. | |
| 5,708,961 A | 1/1998 | Hylton et al. | 455/4.2 |
| 5,726,660 A | 3/1998 | Purdy et al. | |
| 5,729,471 A | 3/1998 | Jain et al. | 725/131 |
| 5,758,088 A | 5/1998 | Bezaire et al. | |
| 5,760,824 A | 6/1998 | Hicks, III | 348/14 |
| 5,760,848 A | 6/1998 | Cho | |
| 5,761,697 A | 6/1998 | Curry et al. | |
| 5,768,151 A | 6/1998 | Lowy et al. | 463/2 |
| 5,793,416 A | 8/1998 | Rostoker et al. | 348/17 |
| 5,797,089 A | 8/1998 | Nguyen | |
| 5,806,005 A | 9/1998 | Hull et al. | 455/566 |
| 5,808,695 A | 9/1998 | Rosser et al. | 348/584 |
| 5,812,819 A | 9/1998 | Rodwin et al. | |
| 5,822,324 A | 10/1998 | Kostresti et al. | |
| 5,835,858 A | 11/1998 | White | |
| 5,841,122 A | 11/1998 | Kirchhoff | 235/492 |
| 5,847,612 A | 12/1998 | Birleson | 331/2 |
| 5,847,762 A | 12/1998 | Canfield et al. | 348/415 |
| 5,870,465 A | 2/1999 | Hosbach et al. | |
| 5,878,211 A | 3/1999 | Delagrange et al. | |
| 5,884,957 A | 3/1999 | Shoen et al. | |
| 5,892,554 A | 4/1999 | DiCicco et al. | 348/584 |
| 5,894,320 A | 4/1999 | Vancelette | 348/7 |
| 5,920,701 A | 7/1999 | Miller et al. | |
| 5,933,773 A | 8/1999 | Barvesten | |
| 5,946,635 A | 8/1999 | Dominguez | |
| D413,881 S | 9/1999 | Ida et al. | D14/126 |
| 5,953,056 A | 9/1999 | Tucker | 348/157 |
| 5,953,076 A | 9/1999 | Astle et al. | 348/584 |
| 5,959,539 A | 9/1999 | Adolph et al. | |
| 5,979,757 A | 11/1999 | Tracy et al. | |
| 5,982,445 A | 11/1999 | Eyer et al. | 348/461 |
| 5,990,958 A | 11/1999 | Bheda et al. | 348/407 |
| 5,991,382 A | 11/1999 | Bayless et al. | |
| 5,991,399 A | 11/1999 | Graunke et al. | |
| 5,991,498 A | 11/1999 | Young | |
| 5,999,808 A | 12/1999 | LaDue | 455/412 |
| 6,002,720 A | 12/1999 | Yurt et al. | 375/240 |
| 6,002,995 A | 12/1999 | Suzuki et al. | 702/188 |
| 6,005,927 A | 12/1999 | Rahrer et al. | |
| 6,009,336 A | 12/1999 | Harris et al. | 455/566 |
| 6,016,348 A | 1/2000 | Blatter et al. | 380/5 |
| 6,034,621 A | 3/2000 | Kaufman | |
| 6,034,716 A | 3/2000 | Whiting et al. | 348/36 |
| 6,043,837 A | 3/2000 | Driscoll, Jr. et al. | 348/36 |
| 6,064,860 A | 5/2000 | Ogden | 455/66 |
| D426,527 S | 6/2000 | Sakaguchi | D14/126 |
| 6,073,124 A | 6/2000 | Krishnan et al. | |
| 6,073,171 A | 6/2000 | Gaughan et al. | |
| 6,078,954 A | 6/2000 | Lakey et al. | 709/223 |
| 6,095,423 A | 8/2000 | Houdeau et al. | 235/487 |
| 6,100,925 A | 8/2000 | Rosser et al. | 348/169 |
| 6,104,414 A | 8/2000 | Odryna et al. | 345/909 |
| 6,121,966 A | 9/2000 | Teodosio et al. | 345/346 |
| 6,124,862 A | 9/2000 | Boyken et al. | 345/435 |
| 6,128,143 A | 10/2000 | Nalwa | 359/725 |
| 6,131,025 A | 10/2000 | Riley et al. | 455/414 |
| 6,133,946 A | 10/2000 | Cavallaro et al. | 348/135 |
| 6,137,525 A | 10/2000 | Lee et al. | 348/14 |
| 6,144,402 A | 11/2000 | Norsworthy et al. | 725/109 |
| 6,144,702 A | 11/2000 | Yurt et al. | 375/240.01 |
| 6,154,250 A | 11/2000 | Honey et al. | 348/157 |
| 6,167,092 A | 12/2000 | Lengwehasatit | 375/240.2 |
| 6,169,568 B1 | 1/2001 | Shigetomi | |
| 6,192,257 B1 | 2/2001 | Ray | 455/566 |
| 6,204,843 B1 | 3/2001 | Freeman et al. | 715/719 |
| 6,215,484 B1 | 4/2001 | Freeman et al. | 725/126 |
| 6,222,937 B1 | 4/2001 | Cohen et al. | 382/154 |
| 6,227,974 B1 | 5/2001 | Eilat et al. | 463/40 |
| 6,252,586 B1 | 6/2001 | Freeman et al. | 725/136 |
| 6,256,019 B1 | 7/2001 | Allport | 345/169 |
| 6,269,483 B1 | 7/2001 | Broussard | |
| 6,271,752 B1 | 8/2001 | Vaios | 340/541 |
| 6,289,464 B1 | 9/2001 | Wecker et al. | |
| 6,295,094 B1 | 9/2001 | Cuccia | 348/559 |
| 6,317,039 B1 | 11/2001 | Thomason | |
| 6,317,776 B1 | 11/2001 | Broussard et al. | |
| 6,400,264 B1 | 6/2002 | Hsieh | 340/506 |
| 6,405,371 B1 | 6/2002 | Oosterhout et al. | 725/39 |
| 6,424,369 B1 | 7/2002 | Adair et al. | 348/76 |
| 6,434,403 B1 | 8/2002 | Ausems et al. | 455/556 |
| 6,434,530 B1 | 8/2002 | Sloane et al. | 705/1 |
| 6,442,637 B1 | 8/2002 | Hawkins et al. | |
| 6,456,334 B1 | 9/2002 | Duhault | 348/565 |
| 6,466,202 B1 | 10/2002 | Suso et al. | 345/169 |
| 6,522,352 B1 | 2/2003 | Strandwitz et al. | 348/211.2 |
| 6,525,762 B1 | 2/2003 | Mileski et al. | 348/81 |
| 6,526,335 B1 | 2/2003 | Treyz et al. | 701/1 |
| 6,535,493 B1 | 3/2003 | Lee et al. | 370/329 |
| 6,549,624 B1 | 4/2003 | Sandru | |
| 6,560,443 B1 | 5/2003 | Vaisanen et al. | |
| 6,564,070 B1 | 5/2003 | Nagamine et al. | 455/556.1 |
| 6,570,889 B1 | 5/2003 | Stirling-Gallacher et al. | 370/479 |
| 6,578,203 B1 | 6/2003 | Anderson, Jr. et al. | 725/141 |
| 6,579,203 B2 * | 6/2003 | Wang et al. | 475/162 |
| 6,602,191 B2 | 8/2003 | Quy | |
| 6,608,633 B1 | 8/2003 | Sciammarella et al. | 715/700 |
| 6,624,846 B1 | 9/2003 | Lassiter | 348/211.4 |
| 6,647,015 B2 | 11/2003 | Malkemes et al. | 370/401 |
| 6,657,654 B2 | 12/2003 | Narayanaswami | 348/14.04 |
| 6,669,346 B2 | 12/2003 | Metcalf | 353/94 |
| 6,675,386 B1 * | 1/2004 | Hendricks et al. | 348/143 |
| 6,681,398 B1 | 1/2004 | Verna | 725/141 |
| 6,714,797 B1 | 3/2004 | Rautila | |
| 6,728,518 B1 | 4/2004 | Scrivens et al. | |
| 6,731,940 B1 | 5/2004 | Nagendran | |
| 6,754,509 B1 | 6/2004 | Khan et al. | |
| 6,757,262 B1 | 6/2004 | Weisshaar et al. | |
| 6,766,036 B1 | 7/2004 | Pryor | 382/103 |
| 6,782,102 B2 | 8/2004 | Blanchard et al. | 380/270 |
| 6,813,608 B1 | 11/2004 | Baranowski | |
| 6,819,354 B1 | 11/2004 | Foster et al. | |
| 6,912,513 B1 | 6/2005 | Candelore | |
| 6,931,290 B2 | 8/2005 | Forest | 700/90 |
| 6,934,510 B2 | 8/2005 | Katayama | 455/3.06 |
| 6,970,183 B1 | 11/2005 | Monroe | |
| 6,986,155 B1 | 1/2006 | Courtney et al. | 725/87 |
| 7,124,425 B1 | 10/2006 | Anderson, Jr. et al. | |
| 7,149,549 B1 | 12/2006 | Ortiz et al. | |
| 7,162,532 B2 | 1/2007 | Koehler et al. | |
| 7,196,722 B2 | 3/2007 | White et al. | |
| 7,376,388 B2 | 5/2008 | Ortiz et al. | |
| 2001/0040671 A1 | 11/2001 | Metcalf | 353/94 |

| | | |
|---|---|---|
| 2001/0042105 A1 | 11/2001 | Koehler et al. |
| 2001/0045978 A1 | 11/2001 | McConnell et al. |
| 2002/0018124 A1 | 2/2002 | Mottur et al. |
| 2002/0058499 A1 | 5/2002 | Ortiz ........................ 455/412.1 |
| 2002/0069419 A1 | 6/2002 | Raverdy et al. |
| 2002/0115454 A1 | 8/2002 | Hardacker .................. 455/457 |
| 2002/0186668 A1 | 12/2002 | Thomason |
| 2002/0188943 A1 | 12/2002 | Freeman et al. ............... 725/38 |
| 2003/0041334 A1 | 2/2003 | Lu ............................ 725/113 |
| 2003/0046108 A1 | 3/2003 | Labadie |
| 2003/0105845 A1 | 6/2003 | Leermakers |
| 2005/0046698 A1 | 3/2005 | Knight |
| 2005/0060751 A1 | 3/2005 | Glaser ......................... 725/87 |
| 2006/0170778 A1 | 8/2006 | Ely et al. |
| 2007/0129817 A1 | 6/2007 | Cadiz ........................... 700/17 |
| 2007/0275746 A1 | 11/2007 | Bitran |

OTHER PUBLICATIONS

Richard Alm, "New Arena a Technical Marvel," The Dallas Morning News, Oct. 15, 2000, pp. 1-6.

"ChoiceSeat, Live Interactive Event Entertainment," www.choiceseat.com, Oct. 15, 2000 pp. 1-5.

"Unstrung: The Birth of the Wireless Internet," CIBC World Markets, Equity Research, Oct. 4, 2000, pp. 1-140.

Brian Bergstein, "Click Me Out to the Ballgame, Web-Wired Stadiums Aim to Spur Evolution of Spectator Sports," Las Vegas Review Journal, Online Edition, Oct. 20, 2000, pp. 1-4.

Stephanie Sanborn, "Armchair Quarterbacks go Wireless at 3Com Park"; InfoWorld, Sep. 29, 2000, pp. 1-2.

"Peanuts, popcorn and a PC at the old ballpark," www.king5.com, Sep. 28, 2000, pp. 1-4.

Brigan Bergstein, "Having a Ball with Technology, High-Tech Firms Teaming up with Pro Sports Venues," www.abcnews.com, Sep. 27, 2000, pp. 1-2.

Wu et al., "On End-to-End Architecture for Transporting MPEG-4 Video over the Internet"; IEEE Transactions on Circuits and Systems for Video Technology, vol. 10, No. 6, pp. 1-18, Sep. 2000.

"3Com: Don't Get Up, Sports Fans," USA Today, Tech Report, Aug. 22, 2000, pp. 1-2.

Scott Boyter, "Product likely to be home run with sports fans," DFW TechBiz, Aug. 21, 2000, pp. 1-3.

David Carnoy, "LG TP3000"; CNET Wireless, Aug. 17, 2000, pp. 1-2.

"SGI at the Pepsi Center"; Silicon Graphics, Inc.; Jul. 2000, pp. 1-2.

"Wireless Dimensions Corporation Adds to Mobile-Venue Suite™"; Press Release, Wireless Dimensions; Allen, Texas; Jul. 26, 2000; http://www.wirelessdimensions.net/news.html, pp. 1-2.

"Wireless Dimensions Corporation Unveils Mobile-Venue Suite™"; Press Release, Wireless Dimensions; Allen, Texas; Jun. 19, 2000; http://www.wirelessdimensions.net/news.html, pp. 2-3.

"Contactless Applications for PDAs"; Inside Technologies, Cartes 2000, Aug. 2000, pp. 1-14.

"Seeing is Believing—Motorola and Packetvideo Demonstrate MPEG-4 Video over GPRS," Press Release, Packetvideo, May 10, 2000, pp. 1-3.

"IEEE 802.11b Wireless LANs," 3COM Technical Paper, Apr. 25, 2000, pp. 1-3, pp. 1-13.

Capin et al., "Efficient Modeling of Virtual Humans in MPEG-4"; 0-7803-6536-4/00, IEEE 2000, pp. 1-4.

W.A. Adamson et al., "Secure Distributed Virtual Conferencing: Multicast or Bust"; CITI Technical Report 99-1, Center for Information Technology Integration, University of Michigan, Ann Arbor, Jan. 25, 1999, pp. 1-7.

N.T. Trask et al., "Smart Cards in Electronic Commerce"; BT Technol J. vol. 17, No. 3, Jul. 1999, pp. 57-66.

Battista et al., "MPEG-4: A Multimedia Standard for the Third Millenium, Part 1"; 1070-986X/99, IEEE 1999, pp. 74-83.

"Fiber Optic Video/Audio/Intercom/Data System," Telecast Fiber Systems, Inc., pp. 1-4.

Thomas Lauterbach & Matthias Unbehaun, "Multimedia Environment for Mobiles (MEMO)—Interactive Multimedia Services to Portable and Mobile Terminals," Robert Bosch Multimedia-Systems GmbH & Co., KG., Hildesheim, Germany, 1997, pp. 1-6.

* cited by examiner

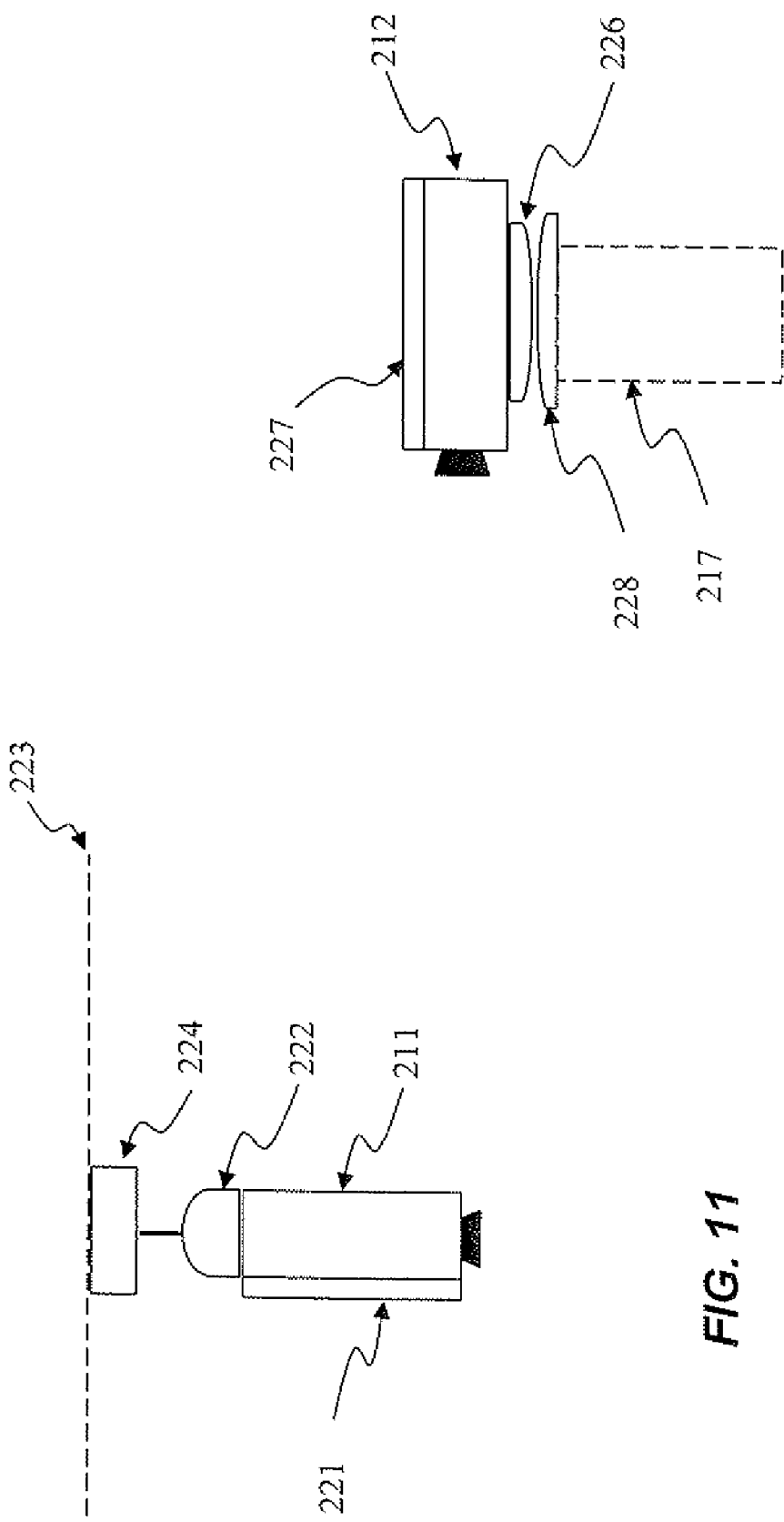

DISPLAYING BROADCASTS OF MULTIPLE CAMERA PERSPECTIVE RECORDINGS FROM LIVE ACTIVITIES AT ENTERTAINMENT VENUES ON REMOTE VIDEO MONITORS

PRIORITY AND CROSS-REFERENCE TO RELATED APPLICATIONS

This application is a continuation of U.S. patent application Ser. No. 10/620,098, entitled "Providing multiple synchronized camera views for broadcast from a live venue activity to remote viewers", filed, Jul. 14, 2003, now U.S. Pat. No. 7,796,162 which is a continuation-in-part as follows:

a continuation-in-part of U.S. patent application Ser. No. 09/708,776, entitled "Providing Multiple Perspectives for a Venue Activity Through an Electronic Hand Held Device", filed Nov. 8, 2000, now U.S. Pat. No. 7,149,549 which was a non-provisional of a provisional patent application, Ser. No. 60/243,561, entitled "Providing Multiple Perspectives for a Venue Activity Through an Electronic Hand Held Device," filed Oct. 26, 2000;

a continuation-in-part of U.S. patent application Ser. No. 09/902,348, entitled "Providing Multiple Perspectives of a Venue Activity to Electronic Wireless Hand Held Devices," filed Jul. 10, 2001, now U.S. Pat. No. 7,812,856 which was also a non-provisional of the provisional patent application, Ser. No. 60/243,561, entitled "Providing Multiple Perspectives for a Venue Activity Through an Electronic Hand Held Device," filed Oct. 26, 2000; and a continuation-in-part of U.S. patent application Ser. No. 10/015,458, "Wireless Transmission of In-Play Camera Views to Hand Held Devices," filed Dec. 13, 2001. The contents of the aforementioned U.S. patent application Ser. Nos. 09/708,776, 09/902,348, and 10/015,458 are incorporated, herein, in their entirety, by reference.

TECHNICAL FIELD

The present invention is related to entertainment broadcasting. The present invention is also related to remote video monitors such as wireless electronic hand held devices including Personal Digital Assistants (PDAs), data-enabled wireless cellular telephones, and flat panel displays such as high definition television (HDTV) sets used in homes. The present invention also relates to systems and methods for displaying broadcasting multiple perspectives of video-related data at remote video monitors. The present invention also relates to techniques for providing increased viewing opportunities for audiences in venue environments, such as stadiums and concert arenas, as well as home-based ad audience. Additionally, the present invention relates to the display of multiple video perspectives simultaneously on a single remote video monitor.

BACKGROUND OF THE INVENTION

Broadcasting is the distribution of audio and/or video signals which transmit programs to an audience. The audience can be the general public or private. There is a wide variety of broadcasting systems, all of which have different capabilities. The smallest broadcasting systems are institutional public address systems, which transmit spoken messages and music within, for example, a school or hospital, and low-powered radio or television stations transmitting programs to a small local area. National radio and television broadcasters have nationwide coverage, using re-transmitter towers, satellite systems, and cable distribution. Satellite radio and television broadcasting can cover areas as wide as entire continents, while internet channels can distribute text or streamed music and speech worldwide. Individuals can also use make use of internet services to stream sound and video.

Most modern stadiums and live entertainment facilities or sports arenas (herein also collectively referred to as "entertainment venues") employ large television-type screens (e.g., "JumboTrons") that receive video images and are linked within the stadium to a plurality of television cameras positioned to capture video images of activities from diverse locations within the stadium. The audience at a typical sporting event, for example, can view advertisements, instant replays, and other sports related data on the large television screens within the sports stadium itself. Feeds can be additionally generally provided from the cameras to media directors in a broadcast booth, replaying certain plays from the event so that announcers can make comments about plays, and finally transmitting (broadcasting) a telecast to the viewing audience, including some aspects of captured video and data to the stadium audience.

Despite the availability of such big screen monitors, venue activity audiences still lack enhanced viewing options or perspectives within the venue itself. To compensate for the lack of viewing options, sports and concert promoters often rent binoculars to audience members prior to or during the event. Such binoculars can permit the typical audience member to obtain a somewhat better, but limited, view of the event, such as a football or hockey game, but even these views are often obstructed by other audience members and are tied to only one perspective.

The large screens placed in a venue such as a stadium are typically linked to cameras that are fixed or mobile. Placement of cameras about the stadium or arena is generally tied to an enterprise system. The movement of the game ball in a football game, for example, along with the players on the field is dynamic and unpredictable, and cannot always be caught by the active camera having the best perspective. Thus, during a game, the large television screens typically provide only one view, which can be further obstructed by other players or officials, often destroying a critical angular view.

In addition, such large screens are often utilized to bombard audience members with information, such as advertisements, thereby cutting into venue activity video that venue audience members might otherwise wish to view such as instant replays, a current play or other event data. The audience members, therefore, essentially view the large screen at the behest of the camera operator or media director and cannot select their own views or camera angles. These limitation are also experienced by remote audiences (e.g., broadcast observers located at home) that might be viewing the activity on a remote video monitor, such as a high definition television (HDTV), through multimedia content providers such as cable and satellite content broadcasters (e.g., Comcast™, Directv™, Dish Network™).

Based on the foregoing, the present inventor found that such limitations over viewing activities occurring within live entertainment venue environments can be solved through the use of remote video monitors including flat panel displays such as high definition television (HDTV) systems used in homes, and flat panel displays associated with computers and incorporated in hand held wireless video-enabled devices.

The present inventor realized that a solution to limitations in the art over the remote viewing of video content using remote video monitors such as flat panel displays used at homes, computer screens and displays associated with wireless hand held devices can be overcome, which call all be referred to as "flat panel displays." By utilizing modern technology integrated with remote video monitors, and the availability of on-demand live action, multiple camera angles, instant replays, and real-time team, player, event and venue information, remote audiences can enjoy entertainment video content on remote video monitors regardless of their location. Such services and systems can provide the venue attendee with increased mobility and freedom within and throughout the venue environment or alternate viewing opportunities at home when receiving broadcasts of video perspective recorded at live entertainment venues.

SUMMARY OF THE INVENTION

One aspect of the present invention provides improved methods and systems for delivering venue-related data to remote video monitors.

It is another aspect of the present invention to provide improved methods and systems for displaying video broadcasts video captured by video cameras at live entertainment venues to remote video monitors including flat panel displays included in wireless hand held devices, computers and HDTVs.

It is still another aspect of the present invention to provide methods and systems for displaying multiple perspectives from entertainment venue activities for simultaneous viewing as video on remote video monitors.

It is yet another aspect of the present invention to provide remote video monitors that provide on-demand video action and instant replays from multiple camera angles focused on entertainment venue activities.

It is still another aspect of the present invention to enable users of remote video devices to selectively view single and simultaneous perspectives of on-demand video action and instant replays broadcasted from more than one camera recording activities at entertainment venues.

It is yet another aspect of the present invention to provide in-play camera views for broadcast to hand held devices, including on-demand video action and instant replays from one or more cameras focused on venue activities through at least one of a wireless telecommunications network, a cable television network and a satellite television network.

It is yet another aspect of the present invention to provide views from more than one synchronized camera at a time deployed around a single activity (e.g., athletes in a boxing ring or performers on a concert stage) for broadcast to hand held devices through a data communications network for selective unitary and simultaneous, synchronous display on a remote video monitor.

It is yet another aspect of the present invention to provide in-play camera views (e.g., auto racing vehicle in-play camera, helmet camera) for broadcast through a wireless communications network at a venue for remote viewing on remote video monitors.

It is yet another aspect of the present invention to provide views from more than one synchronized camera deployed around an activity (e.g., boxing, wresting or martial arts ring, or concert stage) for broadcast through data networks for display on remote video monitors.

The above and other aspects of the invention can be achieved as will now be further described. A method and system is disclosed herein for broadcasting and displaying multiple camera views of venue-based activities for display on remote video monitors. The multiple video cameras are located about or within at least one entertainment venue (e.g., arenas and stadiums for activities including boxing, wrestling, martial arts, auto racing, golf, football, concerts, etc.).

An in-play camera view can be processed for display on a display screen associated with a remote video monitor. Thereafter, a user of the remote video monitor can be enabled to selectively view one or more the synchronized and/or in-play camera views at a time on a remote video monitor. The camera views can be displayed at the remote video monitor in response to user input.

More than one video camera perspective can be processed for simultaneous display on a flat panel display associated with a remote video monitor. Thereafter, simultaneous camera perspectives can be displayed on a flat panel display screen associated with the remote video monitor, thereby enabling a user of the remote viewing device to selectively view the synchronized and/or in-play camera views. The simultaneous camera views can be displayed at the remote video monitor in response to user input (e.g., on-demand).

In addition, video perspective from cameras at live entertainment venue, including synchronized or in-play camera views captured by cameras at a single venue, can be recorded on a server and/or remote video monitor equipment associated with cable and satellite television providers for subsequent replay on remote video monitors.

BRIEF DESCRIPTION OF THE DRAWINGS

The novel features believed characteristic of this invention are set forth in the appended claims. The invention itself, however, as well as a preferred mode of use, further objects, and advantages thereof will best be understood by reference to the following detailed description of illustrative embodiments when read in conjunction with the accompanying drawings, wherein:

FIG. 11 illustrates a block diagram of a synchronized master camera, which can be implemented in accordance with an alternative embodiment of the present invention;

FIG. 12 illustrates a synchronized slave camera, which can be implemented in accordance with an alternative embodiment of the present invention;

DETAILED DESCRIPTION OF PREFERRED EMBODIMENT

Figure 1:
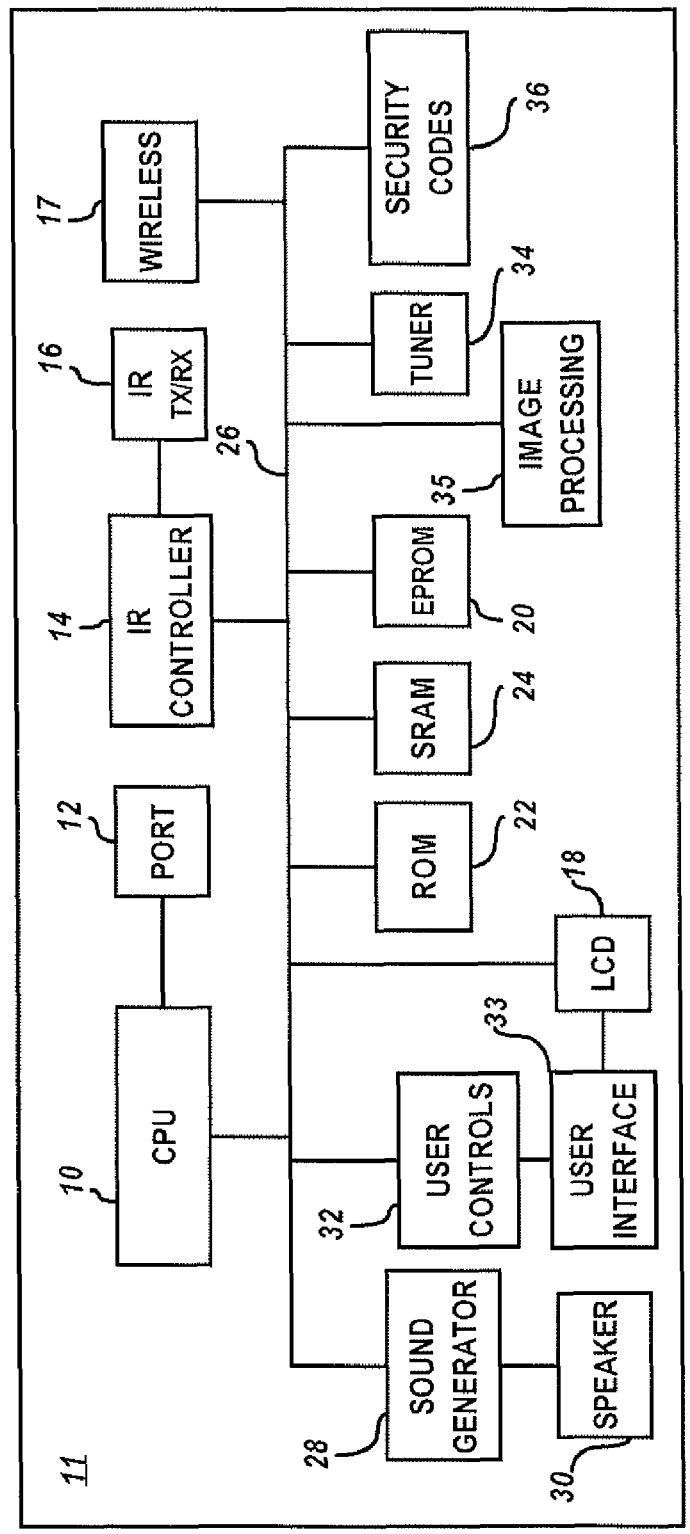
FIG. 1 depicts a block diagram illustrating components that can be included in a remote video monitor in which embodiments of the present invention can be implemented.
Figure 13:
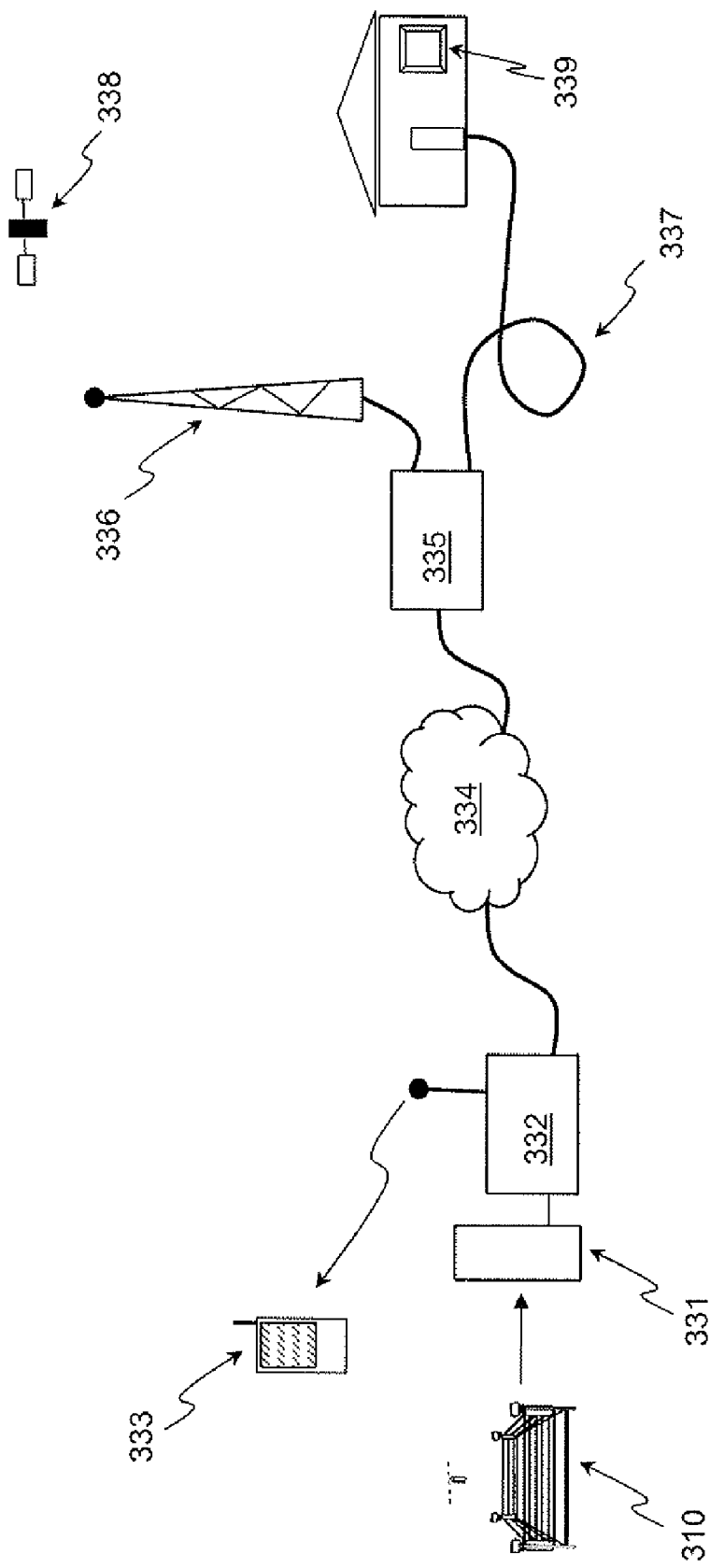
FIG. 13 illustrates a broadcasting system illustrating the acquisition of video perspectives at entertainment venues for transmission to remote video monitors in the form of hand held devices and home-based HDTV equipment through local networks, wireless transmission, satellite broadcasting and cable broadcasting, which can be implemented in accordance with an alternative embodiment of the present invention.

FIG. 1 depicts a schematic diagram illustrating a general hardware configuration and hardware module that can be included in a remote video monitor 11, whether the remote video monitor can be a wireless hand held device or stationary High Definition Television (HDTV), in accordance with an embodiment of the present invention. Those skilled in the art can appreciate, however, that other hardware configurations with less or more hardware and/or modules can be utilized in carrying out the methods and systems (e.g., a HDTV 339 located at a home instead of hand held device 333 as shown in FIG. 13). Reference to hand held devices should not be interpreted as a limitation of the present invention where it can be appreciated that remote video monitors including flat panel displays adapted to simultaneously display video from disparate sources can be provided in different format and at different locations (mobile or fixed) In order to benefit from the teachings herein.

Referring again to FIG. 1, CPU 10 of remote video monitor 11 performs as a main controller operating under the control of operating clocks supplied from a clock oscillator. External pins of CPU 10 can be coupled to an internal bus 26 so that it can be interconnected to other components operating within the remote video monitor 11. A SRAM 24 can be configured as a writeable memory that does not require a refresh operation and can be generally utilized as a working area of CPU 10. SRAM (Static RAM) can generally take a form of semiconductor memory (RAM) based on a logic circuit known as a flip-flop, which retains information as long as there is enough power to run the device. ROM 22 can be configured as a read only memory for storing character images (e.g., font) displayable on a display 18, which can be provided in the form of a flat panel video display. Examples of types of flat panel displays that can be utilized in accordance with display 18 include a TFT active matrix display, an illuminated LCD (Liquid Crystal Display), and other flat panel displays that are currently being developed or sold.

CPU 10 of the present embodiment drives display 18 utilizing, among other media, font images from ROM 22, and images received as broadcasted data through remote video monitor 11 and processed by image-processing module 35. An EPROM 20 can be configured as a read only memory that is generally erasable under certain conditions and can be utilized for permanently storing control codes for operating respective hardware components and security data, such as a remote video monitor serial number, authorization codes, etc. Authorization codes can be provided via a separate cartridge (e.g., smart card) placed in communication with remote video monitor 11, such as the module 53 shown that can be inserted into remote video monitor 11 in FIG. 3.

Figure 3:
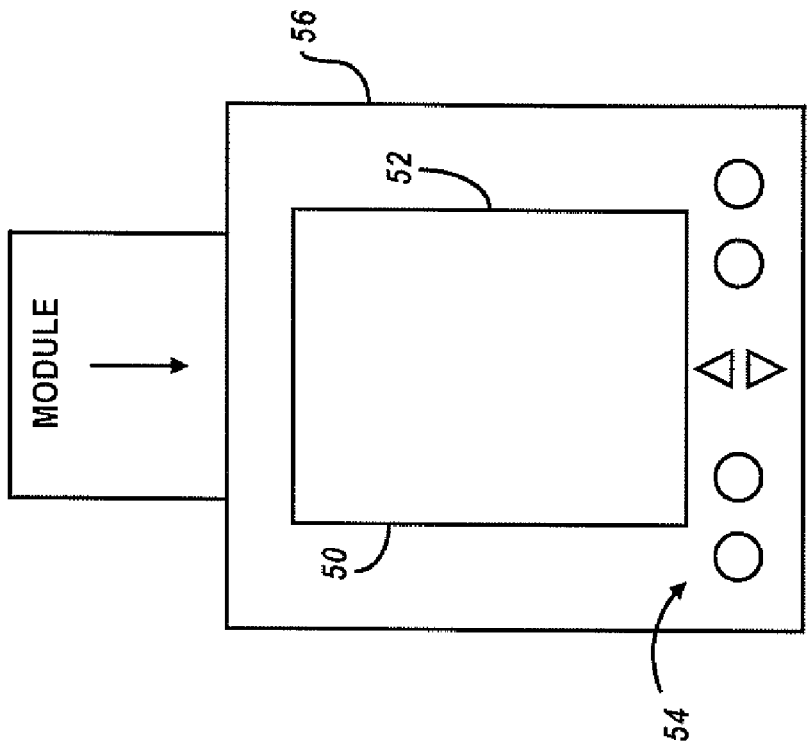
FIG. 3 depicts a pictorial representation of a remote video monitor adapted for receiving a module in accordance with embodiments of the present invention.

An IR controller 14 can generally be configured as a dedicated controller for processing infrared codes transmitted/received by an IR transceiver 16 and for capturing the same as computer data. Wireless unit 17 can generally be configured as a dedicated controller and transceiver for processing wireless data transmitted from and to a wireless communications network. Note that wireless unit 17 can be implemented as a separate module or cartridge, such as illustrated in FIG. 3. Wireless unit 17 can thus comprise a wireless module.

Port 12 can be connected to CPU 10 and can enable temporary attachment of the remote video monitor 11 to, for example, a docking station or computer to transmit information to and from hand held device 11 to other devices such as personal computers, retail cash registers, electronic kiosk devices, and so forth. Port 12 can also be configured, for example, to link with a modem, cradle or docking station that permits network devices, a personal computer or other computing devices to communicate with hand held device 11.

User controls 32 permit a user to enter data to hand held device 11 and initiate particular processing operations via CPU 10. A user interface 33 can be linked to user controls 32 to permit a user to access and manipulate remote video monitor 11 for a particular purpose, such as, for example, viewing images on display 18. Those skilled in the art will appreciate that user interface 33 can be implemented as a touch screen user interface, as indicated by the dashed lines linking display 18 with user interface 33. In addition, CPU 10 can cause a sound generator 28 to generate sounds of predetermined frequencies from a speaker 30. Speaker 30 can be utilized to produce music and other audio information associated with video data transmitted to hand held device 11 form an outside source.

It can be appreciated that additional electronic circuits or the like other than, or in addition to, those illustrated in FIG. 1 can be used to construct hand held device 11. Such components, however, are not described in the present specification, because many aspects of them are known in the art. For example, hand held televisions are available for receiving public television broadcasts, but the basic technology can be modified on such devices so that they can be adapted to (e.g., proper authentication, filters, security codes, or the like) receive venue-based RF transmissions from at least one venue-based RF source (e.g., a wireless camera, or data from a camera transmitted wirelessly through at least one transmitter). Because of the brevity of the drawings described herein, however, only a portion of the connections between the illustrated hardware blocks is generally depicted. In addition, it can be appreciated that remote video monitor 11 can be implemented as a specific type of device, such as a Personal Digital Assistant (PDA), paging device, WAP-enabled mobile phone, and other associated hand held computing devices that might become known in the art.

Given the teaching of various embodiments of the present invention, it should be appreciated that a hand held device 11 can be configured to permit images, similar to television broadcast images, to be displayed on display 18 for a user to view. Hand held device 35 thus includes an image-processing unit 35 for processing images transmitted as data to hand held device 11 through wireless unit 17. A tuner unit 34, implemented as either a single tuner or a plurality of tuners, can be linked through internal bus 26 to CPU 10. Additionally, a security unit 36 can be utilized to process proper security codes to thereby ensure that data transferred to and from hand held device 11 can be secure and/or permitted. Broadcast security prevents general receipt of venue images without proprietary hardware and/or signals.

Security unit 36 can be implemented as an optional feature of hand held device 11. Security unit 36 can also be configured with software, e.g., algorithm routines or subroutines, that are processed by CPU 10, and which prevent wireless data from being transmitted/received from hand held device 11 beyond a particular frequency range, outside of a particular geographical area associated with a local wireless network, or absent authorization codes (e.g., decryption, encryption, coding, decoding, and so forth). Note that security unit 36 can be implemented as a separate security module, such as, for example, a smart card, or cartridge. An example of a module, which can be implemented in accordance with the methods and systems of the present invention, is illustrated in FIG. 3. A security module of this type can be utilized for securing data transmitted from or to a hand held device such as, for example, hand held device 11.

Hand held device 11 can thus be configured with both wireless and wireline capabilities, depending on the needs and requirements of a manufacturer or customer. Such wireless capabilities include features such as those found in cellular telephone units, in accordance with carrying out embodiments of the present invention. Current examples of hand held devices that can be utilized in accordance with the methods and systems of the present invention include the "PalmPilot™" PDA, manufactured and sold by Palm Computing, the Handspring Visor™, Window CE™ compatible devices, RIM™ Blackberry-family paging devices, Motorola paging devices, hand held portable televisions, and the Symbol™ SPT-family of PDA-type organizer devices. Such hand held devices are mentioned herein for illustrative purposes only and are not considered limiting features of the present invention.

Hand held devices which can also be implemented in accordance with the methods and systems of the present invention include hand held devices, such as cellular telephones having viewable display screens for the display of data transmitted through wireless networks. Customized, venue-specific devices (i.e., proprietary, limited use) can be also developed in accordance with the methods and systems of the present invention that incorporate hardware and software modules necessary to practice the methods and systems taught herein.

Those skilled in the art can appreciate that although hand held device 11 is generally illustrated in FIG. 1, remote video monitor 11 can be implemented as a wireless application protocol (WAP) web-enabled cellular hand held device, such as a PDA, wireless telephone, or pager or a combination thereof. remote video monitor 11 can also be configured with features of equipment associated with HDTV for home-based viewing. An example of such a web-enabled cellular hand held device are the Blackberry™ and Palm™ PDA/cellular phone devices, which is manufactured and sold by Palm™ Inc and Research in Motion respectively.

Regardless of the type of remote video monitor 11 implemented, it is anticipated that such hand held devices will be adapted to receive and process data via image-processing unit 35 for ultimate display as moving images on display unit 18, in accordance with the present invention. Image-processing unit 35 can include image-processing routines, subroutines, software modules, and so forth, to perform image-processing operations.

Figure 2:
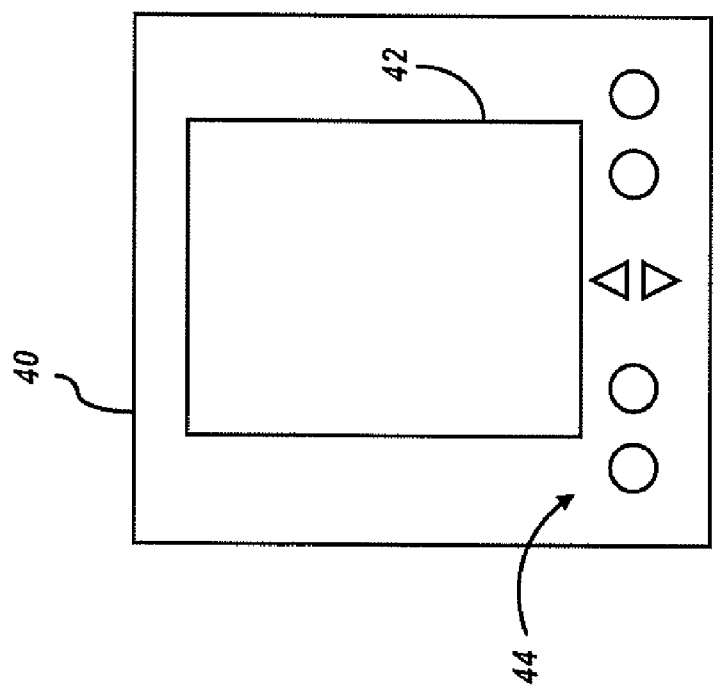
FIG. 2 illustrates a pictorial representation of a remote video monitor, which can be utilized to implement embodiments of the present invention.

FIG. 2 illustrates a pictorial representation of a hand held device 40 that can be utilized to implement preferred embodiments of the present invention. Hand held device 40 includes a display screen 42, which is generally analogous to display 18 of FIG. 1. Television images broadcast via radio frequency or digital data can be displayed on display screen 42 for a user to view. User controls 44 can permit a user to select and/or manipulate images or text displayed on display screen 42. User controls 44 of FIG. 2 are generally analogous to user controls 32 of FIG. 1. A touch screen user interface can be further configured on the display screen 42 with hand held device 40 to permit a user to manipulate images/text displayed on display screen 42.

FIG. 3 depicts a pictorial representation of a remote video monitor 11 in the form of a hand held device 56 adapted for receiving a module 50, in accordance with embodiments of the present invention. Although hand held device 56 of FIG. 3 is generally analogous to hand held device 40 of FIG. 2, the difference being that hand held device 56 can be adapted to receive a module/cartridge that permits hand held device 56 to function according to specific hardware, authorization codes and/or instructions contained in a memory location (e.g., a computer chip or magnetic strip) within module 50. Module 50 can be configured as a smart card, well known in the art. Such a smart card can provide, for example, access codes (e.g., decryption) to enable hand held device 56 to receive venue broadcasts.

Note that as utilized herein, the term "module" can refer to a physical module, such as a cartridge. The term "module" can also refer to a software module composed of routines or subroutines that perform a particular function. Those skilled in the art can appreciate the meaning of the term module is based on the context in which the term is utilized and environment being described. Thus, module 50 as illustrated can be generally configured as a physical cartridge or smart card. The term "module" as utilized herein can also refer to a software module, depending on the context of the discussion thereof.

To illustrate the use of a physical module, such as module 50, assume that a user can possess several such physical modules or cartridges. One module, when inserted into a remote video monitor 11 such as the hand held device shown in FIG. 3 can instruct hand held device 50 to function as a standard PDA, such as a Palm Pilot device. Another module, when inserted into hand held device FIG. 3, can instruct hand held device 56 to function as a remote video monitor 11 that can receive wireless television broadcasts and/or data from broadcast networks and/or venue-based (e.g., short range) wireless broadcasts and cellular networks. Such a module can also incorporate decryption capabilities to receive controlled/secured broadcasts at venues.

Those skilled in the art can thus appreciate that hand held device 56 can be adapted to receive and cooperate with module 50. Additionally, hand held device 56 includes a display screen 52 that is generally analogous to display screen 42 of FIG. 2 and display 18 of FIG. 1. Hand held device 56 also includes user controls 54 that are generally analogous to user controls 44 of FIG. 2 and user controls 32 of FIG. 1. Hand held device 56 of FIG. 3 is generally analogous to hand held device 11 of FIG. 1. Thus, hand held device 56 can also implement touch screen capabilities through a touch screen user interface integrated with display screen 52.

Assuming module 50 is implemented as a smart card instead of a cartridge to provide receiver and/or securing capabilities (e.g., encryption, decryption, authorization codes, data decoding, etc.), it is anticipated that similar features can be implemented in accordance with a smart card to insure that hand held device 56 includes touch screen user interface and video viewing capabilities. Smart cards are generally known in the art as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards can be generally configured as either a contact or contactless smart card, or a combination thereof. A contact smart card requires insertion into a smart card reader (e.g., contained within hand held device 56) with a direct connection to, for example, a conductive micromodule on the surface of the card. Such a micromodule can be generally gold plated. Transmission of commands, data, and card status takes place through such physical contact points.

A contactless card requires only close proximity to a reader. Both the reader and the card can be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards, are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Figure 4:
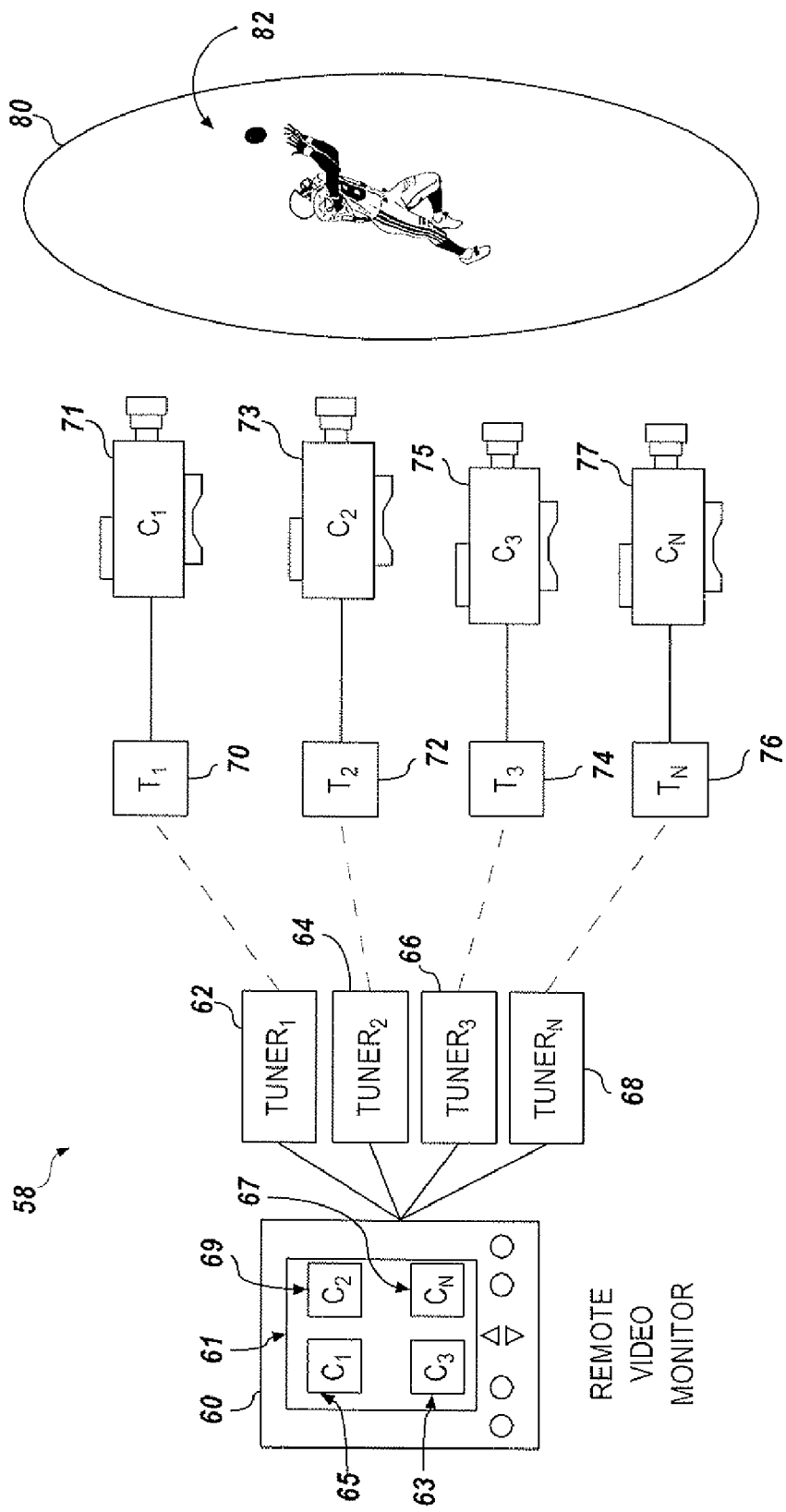
FIG. 4 illustrates a system diagram for broadcasting multiple perspectives to a remote video monitor of activities at a venue in accordance with embodiments of the present invention.

FIG. 4 illustrates a system 58 for broadcasting multiple perspectives through a remote video monitor 60 of activities at a venue 80, in accordance with embodiments of the present invention. For illustrative purposes only, it can be assumed that venue 80 of FIG. 4 is a stadium venue, such as a football stadium. Cameras 71, 73, 75, and 77 are respectively positioned at strategic points about venue 80 to capture the best images of activity taking place within venue 80. Cameras 71, 73, 75, 77 are respectively linked to transmitters 70, 72, 74, and 76. Each of these transmitters can be configured as equipment, which feeds a radio signal to an antenna for transmission. The equipment can also provide for the securing transmission of signals and associated data. For example, such equipment can rely on the encryption of signals. These signals, if encrypted, can be decrypted by authorized remote video monitors 60.

An antenna can be integrated with the transmitter. Transmitters are well known in the art, and include active components, such as a driver, well known in the art. Transmitters also include passive components, such as a TX filter, also well known in the art. These components, when operating together, impress a signal onto a radio frequency carrier of the correct frequency by immediately adjusting its frequency, phase, or amplitude, thereby providing enough gain to the signal to project it to its intended target (e.g., a hand held device located within the venue).

A remote video monitor 60 can be held by a user at a stadium seat location within view of activity at a venue 80. Remote video monitor 60 is generally analogous to remote video monitor 11 of FIG. 1 and hand held device 40 of FIG. 2. Remote video monitor 60 of FIG. 4 can be configured as a hand held device (e.g., PDA, portable television, etc.) adapted for use with a cartridge/module, such as module 50 of hand held device 56 of FIG. 3. The cartridge/module can contain the electronics (e.g., tuner(s), filter(s), security codes, encryption/decryption codes, etc.) to allow a hand held device to be adapted for receiving venue-based data. Remote video monitor 60 includes a display screen 61 (e.g. display 18 of FIG. 1).

Additionally, display screen 61 of remote video monitor 60 can be configured with a touch screen user interface displayable and operable on display screen 61. Those skilled in the art can appreciate that touch screen interfaces are well known in the PDA art and further explanation thereof should not be necessary. Display screen 61 can include a touch screen display area 65 that can be associated with camera 71. Thus, images captured by camera 71 are transmitted from transmitter 70, which is linked to camera 71. Additionally, display screen 61 includes touch screen display areas 69, 63, and 67, which are respectively associated with cameras 73, 75, and 77.

Cameras 71, 73, 75, and 77 are respectively labeled $C_1$, $C_2$, $C_3$, and $C_N$ to indicate that a plurality of cameras can be utilized in accordance with system 58 to view activities taking place within venue 80, such as a football game or concert. Although only four cameras are illustrated in FIG. 4, those skilled in the art will appreciate that additional or fewer cameras can be also implemented in accordance with system 58. Touch screen display areas 65, 69, 63, and 67 are also respectively labeled $C_1$, $C_2$, $C_3$, and $C_N$ to illustrate the association between these display areas and cameras 71, 73, 75, and 77 where and when touch screen technology is utilized.

Remote video monitor 60 can be integrated with one or more plurality of tuners, as illustrated by tuners 62, 64, 66, and 68. Such tuners can be activated via user controls on remote video monitor 60 and/or via touch screen icons or areas, when used, displayed on display screen 61 that are associated with each tuner. Such icons/areas can be respectively displayed within display areas 65, 69, 63 and 67, or within a separate display area of display screen 61 (e.g., picture-within-picture capabilities found on large television sets). A user accesses tuner 62, for example, to retrieve real-time video images transmitted from transmitter 70 for camera 71. Likewise, a user can access tuner 64 to retrieve real-time video images transmitted from transmitter 72 for camera 73.

In addition, a user can access tuner 74 to retrieve real-time video images transmitted from transmitter 74 for camera 75. Finally, user can access tuner 68 to retrieve real-time video images transmitted from transmitter 76 for camera 77. In the example depicted in FIG. 4, a football player 82 is participating in a football game within venue 80. Cameras 71, 73, 75, and 77 capture moving images (e.g., video data) of the football player 82 from various angles and transmit these images to remote video monitor 60.

Figure 5:
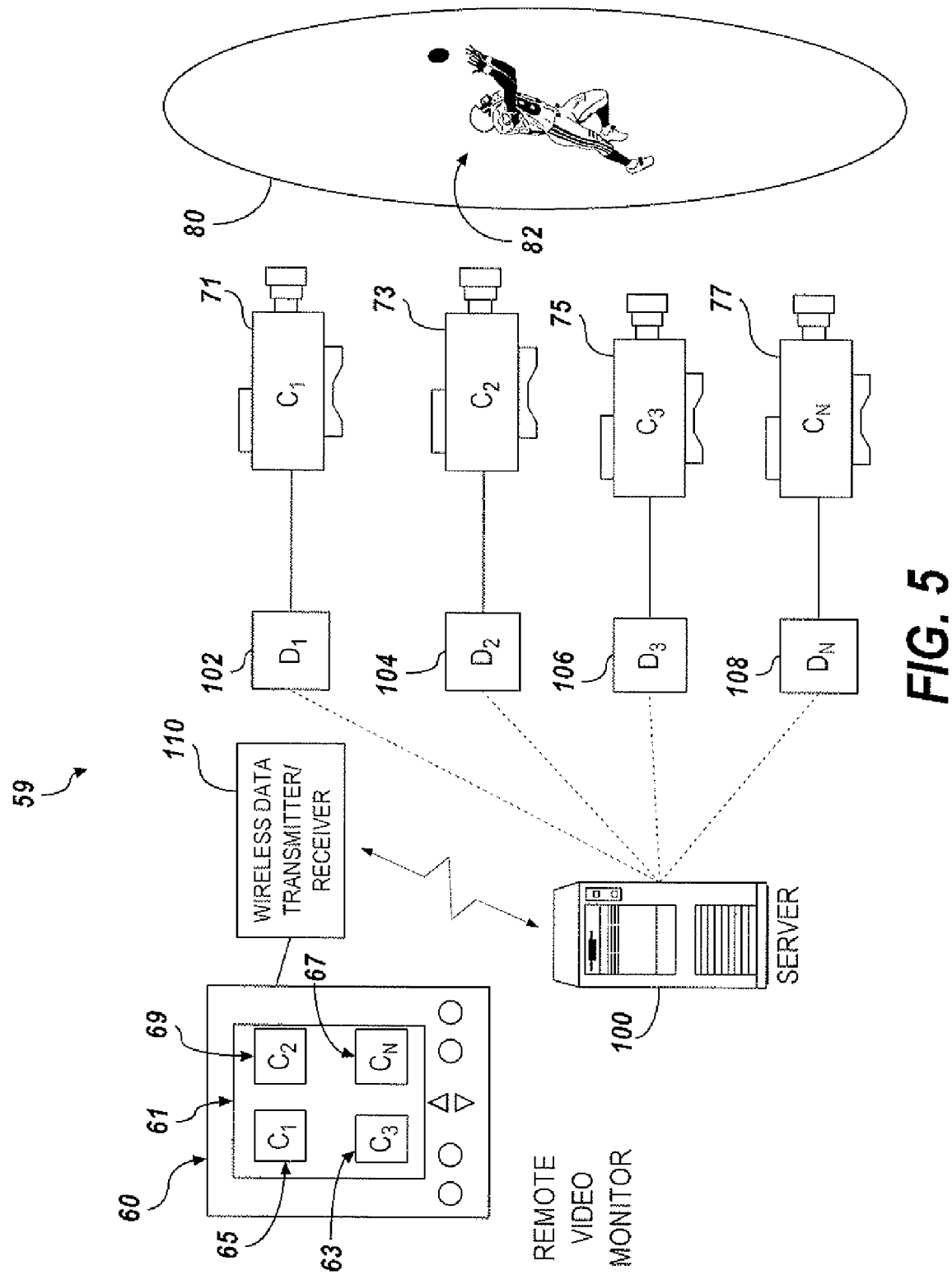
FIG. 5 depicts a system that broadcasts multiple perspectives of a venue activity through a remote video monitor adapted to receive and process video data captured by cameras in real time in accordance with embodiments of the present invention.

FIG. 5 depicts a system 59 that provides multiple perspectives of activity at a venue 80 through a remote video monitor 60 adapted to receive and process real time video data in accordance with embodiments of the present invention. Note that in FIG. 4 and FIG. 5 analogous parts are indicated by identical reference numerals. Thus, for example, cameras 71, 73, 75, and 77 of FIG. 5 are analogous to cameras 71, 73, 75, and 77 of FIG. 4. Remote video monitor 60 of FIG. 5 can also be provided in the form of wireless hand held devices and HDTV equipment.

Remote video monitor 60 of FIG. 5, however, can be configured to receive real time video perspectives captured in real-time by cameras 114 at venues 80 as data transmitted for cameras 71, 73, 75, and 77 respectively through data transmitters 102, 104, 106, and 108 to server 100 and thereafter to wireless data transmitter/receiver 110. Note that wireless data transmitter/receiver 110 is analogous to wireless unit 17 of FIG. 1. Remote video monitor 60 of FIG. 5 is also analogous to remote video monitor 11 of FIG. 1.

Remote video monitor 60 of FIG. 5 can also incorporate a touch screen user interface, as described herein with respect to analogous hand held device 60 of FIG. 4. The difference between system 58 of FIG. 4 and system 59 of FIG. 5 lies in the inclusion of digital transmitters 102, 104, 106, and 108 which are respectively linked to cameras 71, 73, 75, and 77 of FIG. 5. In the illustration of FIG. 5, cameras 71, 73, 75, and 77 can be configured as high definition video cameras which capture real time images of events or activities taking place within venues 80, such as real time video footage of football player 82.

A captured image of football player 82, for example, can be transferred from one or more of video cameras 71, 73, 75, and 77 of FIG. 5 and transmitted through a respective digital transmitter, such as digital transmitter 102, 104, 106 or 108 and transmitted via wired and/or wireless communications to server 100. The server 100 then processes the video data received from one or more of the digital transmitters and formats the video data for transmission via wireless means to wireless data transmitter/receiver 100, which can be integrated with hand held device 100. Transmitter/receiver 100 can communicate with the various components of remote video monitor 60, such as a CPU, image-processing unit, memory units, and so forth.

Those skilled in the art can appreciate that although real time video data can be captured by cameras and transmitted to server 100, captured past video images can also be stored within server 100 and transferred to remote video monitor 60 for display at display screen 61. For example, instant replays can be transferred as video data to remote video monitor e 60 upon the request of a user of remote video monitor 60. Such instant replay footage can be displayed on display screen 61 for the user to view.

Figure 6:
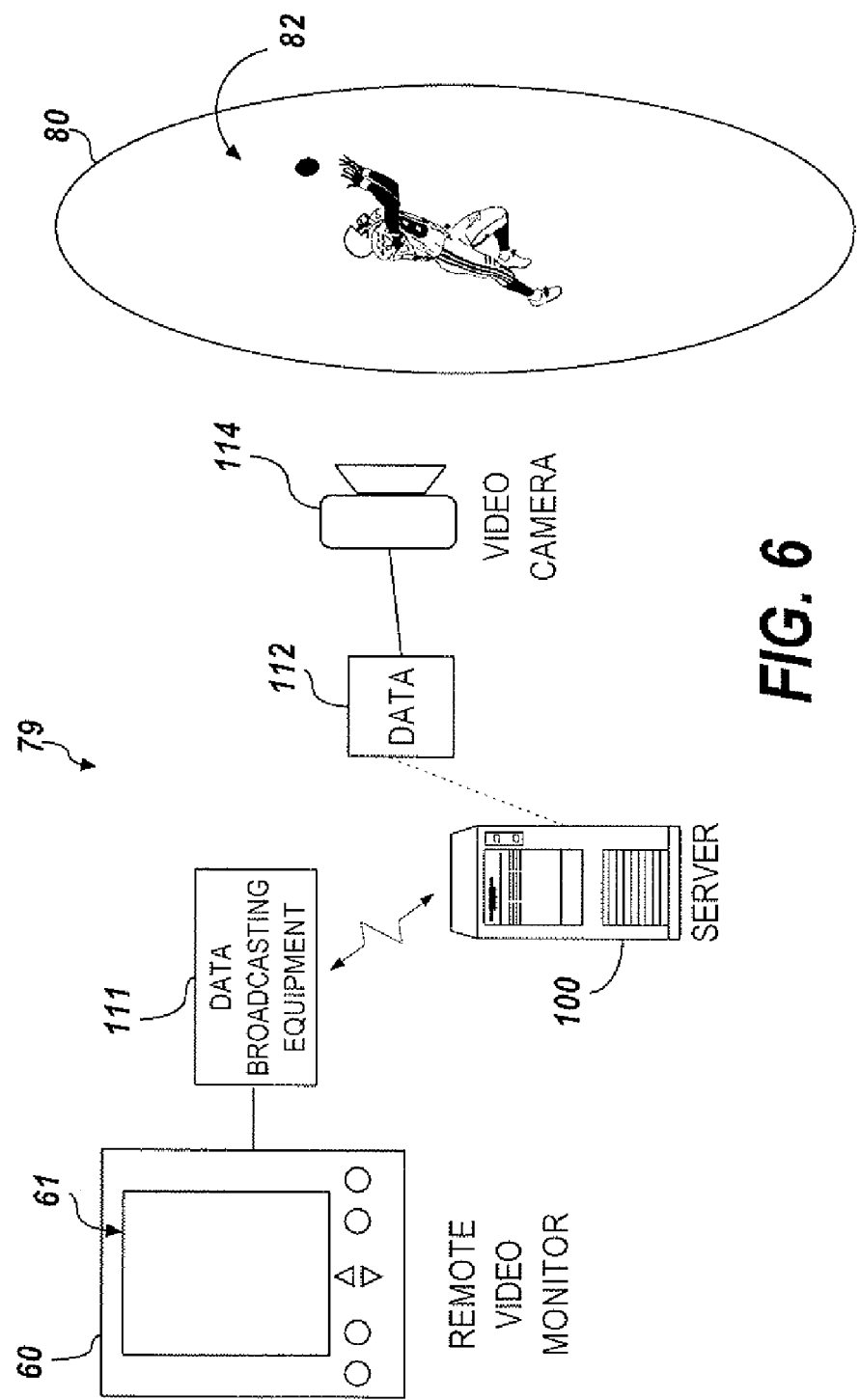
FIG. 6 illustrates a system for broadcasting video perspectives of activity captured in real-time by a camera at a venue and processed through a server and data broadcasting equipment to a remote video monitor adapted to receive and process video data in accordance with embodiments of the present invention.

FIG. 6 depicts a system for broadcasting video perspectives of activity 82 captured in real-time by video cameras 114 at venue 80 and processed through a server 100 and data broadcasting equipment 111 to a remote video monitor 60 adapted to receive and process video data in accordance with embodiments of the present invention. In system 79 of FIG. 6, video camera 114 can be provided as a wide-angle/panoramic (hereinafter referred to as "panoramic") video camera. Video camera 114 can also be configured as a high-definition panoramic video camera that captures images of activities taking place at venue 80. In the example illustrated in FIG. 6, video camera 114 can capture of images of a football game and one or more football players, such as illustrated football player 82.

A data transmitter 112 can be linked to video camera 114. Video data captured by panoramic video camera 114 can be transferred to data transmitter 112, which thereafter transmits the video data to server 100 via a direct link or wireless link, depending on the needs or requirements of the promoters or venue owners. Note that this is also true of the system described in FIG. 6. Server 100 of FIG. 6 is analogous to server 100 of FIG. 5. Thus, in the case of FIG. 5, video data can be transmitted from one or more of data transmitters 102, 104, 106, and 108 via a direct wire/cable link or through wireless transmission means, such as through a wireless network.

Those skilled in the art will appreciate, of course, that remote video display 60 of FIG. 6 is analogous to remote video devices depicted in FIGS. 1-5 herein. In FIGS. 4, 5, and 6, like or analogous parts are identified by identical reference numerals. Thus, images captured by video camera 114 of activities taking place at venues 80 can be displayed as real time video images or instant replay data on display screen 61 of remote video monitor 60.

Figure 7:
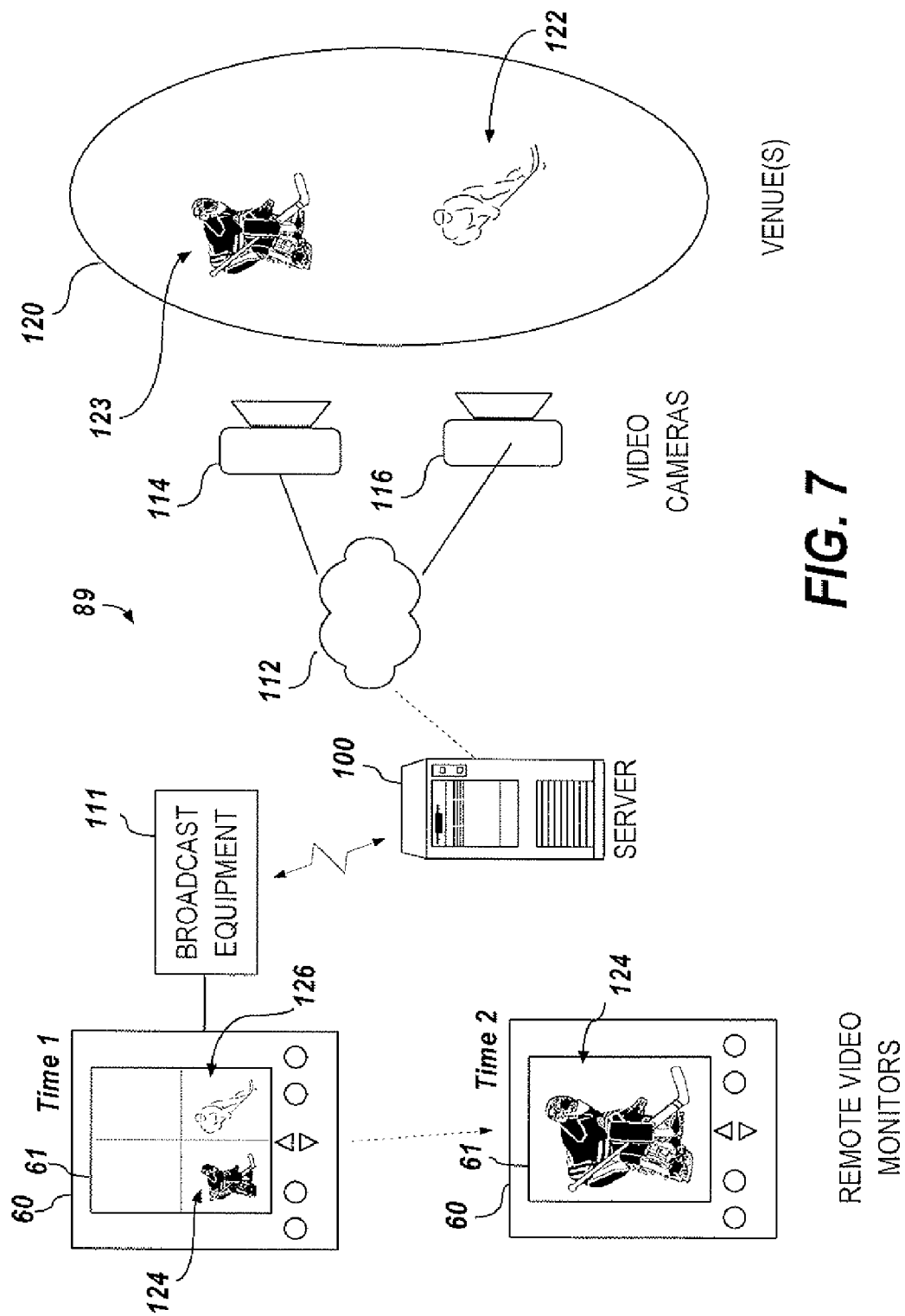
FIG. 7 illustrates a system diagram for providing broadcasting multiple video perspectives of an activity captured by cameras at an entertainment venues for synchronized display as simultaneous video on a remote video monitor at a first time and for display of one video perspective selected by a user at the remote video monitor at a second time in accordance with embodiments of the present invention.

FIG. 7 illustrates a system for providing broadcasting multiple video perspectives of an activity 123 captured by video cameras 116 at an entertainment venue 120 for synchronized display as simultaneous video on a remote video monitor 60 at a first time (Time 1) and for display of one video perspective selected by a user at the remote video monitor 60 at a second time (Time 2) in accordance with embodiments of the present invention. FIG Thus, in system 89 of FIG. 7, an event, in this case illustrated as a hockey game, is taking place within venue 120. Venue 120 can be, for example, a hockey arena. Video camera 114 can be linked to data transmitter 112.

As explained previously, data transmitter 112 can be linked to server 100 via a direct link, such as a transmission cable or line, or through wireless communication means, such as through a wireless network. Server 100 can also communicate with hand held device 60 through a wireless network or other wireless communication means by transmitting data through such a network or wireless communications means to wireless data transmitter/receiver 110. Wireless data transmitter/receiver 110, as explained previously, can be integrated with hand held device 60.

Thus, a video image 124 of a hockey player 122 can be captured as video data by panoramic video camera 114, along with a video image 126 of a hockey player 123 and displayed within display screen 61 of remote video monitor 60 as indicated at Time 1. Video image 124 and 126 can be displayed within a grid-like interface on display screen 61. Note that in the illustration of FIG. 7, display screen 61 can be divided into four sections.

When a user touches, for example the area or section of display screen 61 in which video image 124 can be displayed, the entire display area of display screen 61 can then be consumed with a close-up video shot of video image 124, as indicated at Time 2, thereby providing the user with a closer view of hockey player 122.

Figure 8:
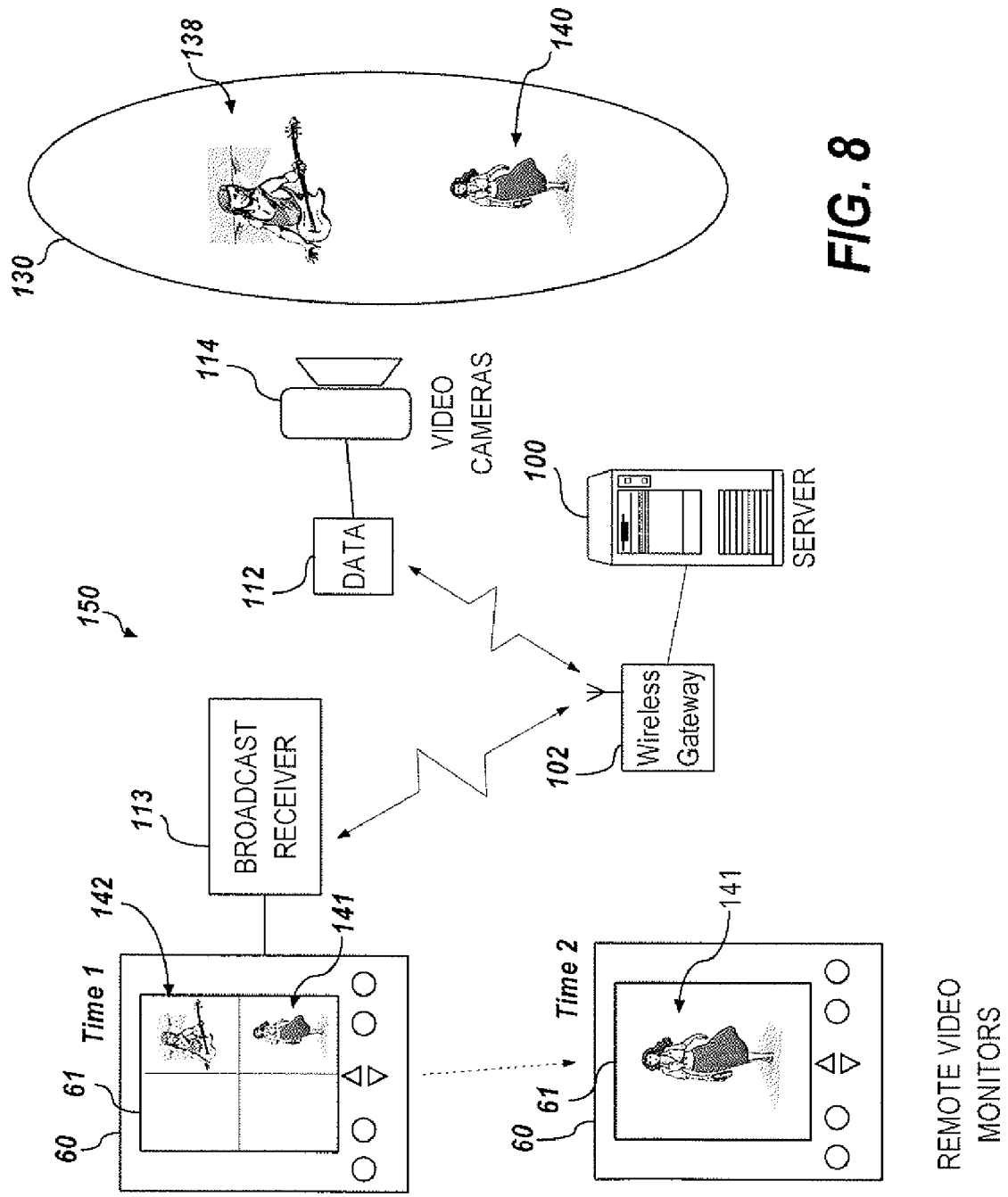
FIG. 8 illustrates a system diagram for capturing and broadcasting multiple perspectives of activities occurring at entertainment venues through a remote video monitor including the use of a wireless gateway to broadcast video perspectives simultaneously to wireless hand held devices operating as remote video monitors in accordance with an embodiment of the present invention.

FIG. 8 illustrates a system diagram 150 for capturing and broadcasting multiple perspectives of activities occurring at entertainment venues 130 through a remote video monitor 60 including the use of a wireless gateway 124 to broadcast video perspectives simultaneously to remote video monitors 60 in accordance with an embodiment of the present invention. Multiple perspectives can be provided through remote video monitors 60 of an activity at a venue 130, including the use of a wireless gateway 102, in accordance with an embodiment of the present invention. Those skilled in the art can appreciate that wireless gateway 102 can be configured as an access point for a wireless LAN (Local Area Network). Access points for wireless LAN networks and associated wired and wireless hardware (e.g., servers, routers, gateways, etc.) are well known in the art and can be utilized in accordance with the present invention described herein. System 150 of FIG. 8 is analogous to system 89 of FIG. 7, the difference being in the nature of the venue activity (concert) and means for transmission (wireless) in FIG. 8. Venue 130 can be, for example, a concert hall or stadium configured with a sound stage.

Figure 9:
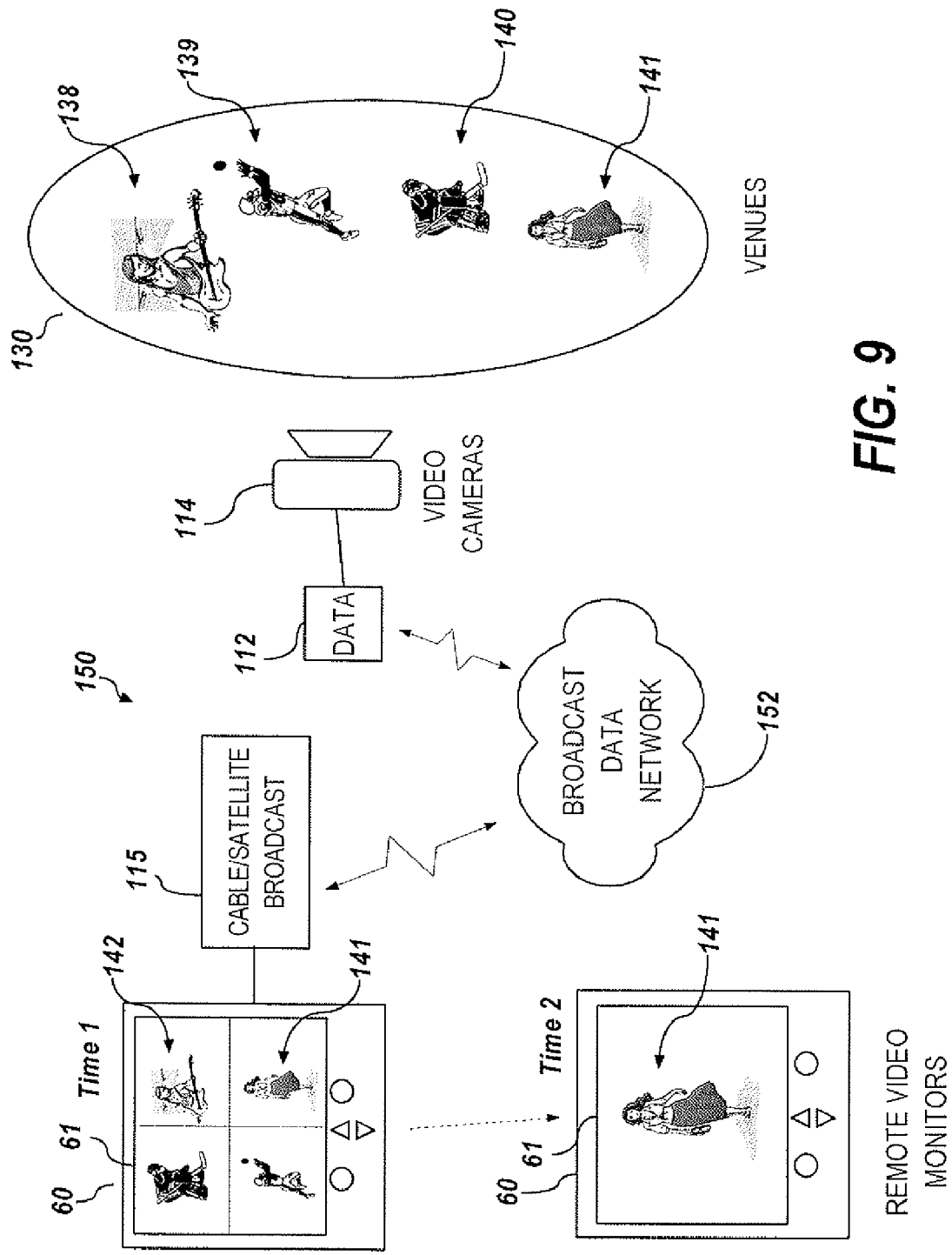
FIG. 9 depicts a system for broadcasting multiple video perspectives captured by cameras located at entertainment venues to remote video monitors, in accordance with embodiments of the present invention.

Gateway 102 can be configured as a communications gateway through which data can enter or exit a communications network, such as wireless network 152 illustrated in FIG. 9 for a large capacity of remote video display 60 users. Wireless network 152 can be configured as a wireless LAN network. Hand held device 60 can be configured to communicate and receive transmissions from such a wireless LAN network based on device identification (e.g., device address).

Communication with hand held devices, such as hand held device 60, however, can also be achieved through RF (Radio Frequency) broadcasts, thereby not requiring two-way communication and authentication between, for example, a wireless LAN network and such remote video monitors. A broadcast under such a scenario can also require that remote video monitors include decryption capabilities or the like in order to be authorized to receive transmissions from the venue.

The remaining elements of FIG. 8 are also analogous to the elements depicted in the previous drawings, with the addition of wireless gateway 124, which can be linked to server 100 and can be in communication with several wireless data transmitters/receivers and one or more electronic remote video devices. Broadcast receivers 113, as explained previously, can be integrated with remote video monitor 60. One or more video cameras 114 can be positioned at a venue 130 at locations that capture images not only of the events taking place on a concert stage, but also events taking place within the stadium itself.

If an audience member 140, for example, happens to be walking along a stadium aisle within view of video camera 114, the audience member's video image can be displayed as video image 144 within display screen 61 of remote video monitor 60, as indicated at Time 1. Likewise, video camera 114 captures images of band member 138 whose video image can be displayed as video image 142 within a display area of remote video monitor 60 screen 61, as indicated at Time 1.

Thus, a user of remote video monitor 60 can view not only the events taking place on a central performing platform of venue 130, but also other events within the arena itself. The band member 138 can be located on a central performing platform (not shown) of venue 130 when video camera 114 captures real-time video images of band member 138. The user can also, for example, wish to see a close-up of audience member 140. By activating user controls and/or a touch screen interface integrated with display screen 61, the user could, for example, pan or zoom to view a close-up video shot of audience member 140, as indicated at Time 2.

Captured video images can be transferred from video camera 114 as video data to wireless gateway 124 to server 100 and through wireless gateway 124 to broadcast receiver 113. Although a single server 100 is illustrated in FIG. 8, those skilled in the art can appreciate that a plurality of servers and/or wireless gateways can be implemented in accordance with the methods and systems of the present invention to process and deliver captured and transmitted video data. Based on the foregoing, those skilled in the art can appreciate that video data can be simultaneously transferred from server 100 or a plurality or servers to literally thousands of hand held devices located within the range of the data network and/or wireless gateways associated with venue 130.

FIG. 9 depicts a system for broadcasting multiple video perspectives captured by video cameras 114 located at entertainment venues 130 to remote video monitors 60, in accordance with embodiments of the present invention. FIG. 9 illustrates a system 150 for providing multiple perspectives through remote video monitors 60 of an activity at a venue 130 in association with a wireless network 152, in accordance with embodiments of the present invention. System 150 of FIG. 9 is analogous to system 92 of FIG. 8, the difference noted in the inclusion of broadcast network 152. Thus, in FIG. 8 and FIG. 9, like or analogous parts are indicated by identical reference numerals. Video data captured by a camera or cameras 114 can be transferred to data transmitter 112, which transmits the video data to wireless network 152. Wireless network 152 then retransmits the data, at the request of authorized users of hand held devices, such as hand held device 60, to wireless data transmitters/receivers, such as transmitter/receiver 110 integrated with hand held device 60.

Those skilled in the art can appreciate that broadcast data network 152 can also receive and retransmit other data, in addition to video data. For example, a server or other computer system can be integrated with wireless network 152 to provide team and venue data, which can then be transferred to wireless data transmitter receiver 110 from wireless network 152 and displayed thereafter as team and venue information within display screen 61 of hand held device 60. Other data that can be transferred to hand held device for display include real-time and historical statistics, purchasing, merchandise and concession information, and additional product or service advertisements.

Such data can include box scores, player information and matchups, animated playbooks, shot/hit/pitch charts, historical information, and offense-defense statistics. In a concert venue, for example, as opposed to a sporting event, information pertaining to a particular musical group can be also transferred to the hand held device, along with advertising or sponsor information. Note that both the video data and other data described above generally comprise types of venue-based data.

Venue-based data, as referred to herein, can include data and information, such as video, audio, advertisements, promotional information, propaganda, historical information, statistics, event scheduling, and so forth, associated with a particular venue and/or its advertisers/sponsors generally not retrievable through public networks. Such information can be transmitted together with video data received from data transmitter 112. Such information can be displayed as streaming data within display area 61 of hand held device 60 or simply stored in a database within hand held device 60 for later retrieval by the user.

One example of a wireless network that can be utilized to implement wireless network 152 can be Bluetooth, which is described in greater detail herein, and was conceived originally to make up for the shortcomings of infrared technologies (IR). Because IR cannot be utilized to penetrate walls, carry data heavy signals, or operate within devices that are not in line of sight, Bluetooth, which is becoming well known the art, can be configured as or with wireless network 152.

Figure 10:
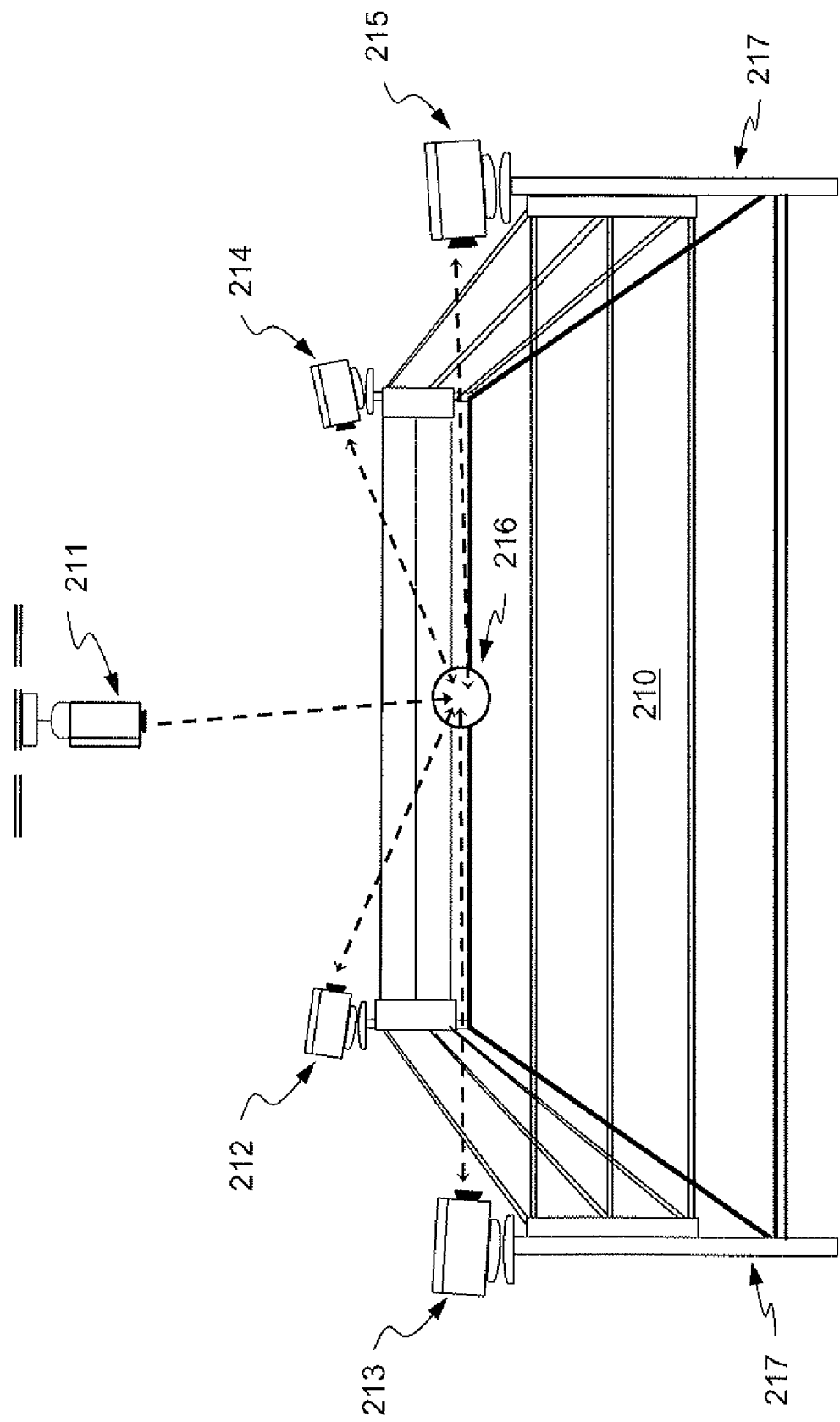
FIG. 10 illustrates an exemplary close-in environment wherein master-slave synchronized cameras can be deployed, which can be used for implementing systems and methods in accordance with an alternative embodiment of the present invention.

FIG. 10 illustrates a system in accordance with what has already been taught regarding the present invention, but for transmitting and displaying venue-based views from synchronized cameras 211-215 to/by remote video monitors. Although FIG. 10 illustrates a contact sports arena 210, such as a boxing or wresting ring, it should be appreciated that synchronized cameras 211-215 as thought herein can be deployed in a concert stage environment or other environments where the activity is close-in.

A synchronized camera system can include a main camera 211 and at least one slave camera 212-215, wherein slave camera 212-215 movement depends on all movement by the master camera 211. Views captured by slave cameras 212-215 are of the same general target area 1160 as those captured by the main camera. A synchronized camera system will typically be set up around a close-in activity area, such as a boxing ring, such that the main camera 211 can provide an overall view of the entire close-in area. Main camera 211 can thus be located proximate to an activity area such as an arena (e.g., boxing arena).

Referring to FIG. 11, illustrated a close up illustration of a main camera 211 such as shown in FIG. 10. The main camera 211 in FIG. 11 is shown mounted above the activity environment 210 to overhead structural support or furnishings 223 belonging to the venue, although it should be appreciated that a temporary support erected above the arena could also be utilized in accordance with particular embodiments. The camera 211 can be mounted utilizing mounting hardware 224. Electrometrical manipulation of the camera's x and y orientation can be provided by electromechanical hardware 221 located between the mounting hardware 224 and the camera 211. Complimentary electronics and/or optics can be coupled to the camera for providing specialized capabilities such as laser beam transmission (e.g., used for optical tracking feature), Ref tag detection, wireless RF communications with remote systems (e.g., other cameras, enterprise IT equipment, or directly to remote viewers located within the venue such as hand held wireless devices held by venue attendees).

Referring to FIG. 12, illustrated a close up illustration of a slave camera 212 such as shown in FIG. 10. The slave camera 212 in FIG. 12 is shown mounted near the activity environment 210 to structural support or furnishings 217 belonging to the venue, although it should be appreciated that temporary support structures can be erected in the arena near the activity environment 210 could also be used. The camera 212 is mounted using mounting hardware 228. Electrometrical manipulation of the camera's x and z orientation is provided by electromechanically hardware 226 located between the mounting hardware 228 and the camera 212. Complimentary electronics and/or optics can be coupled to the camera for providing specialized capabilities such as laser beam detection (e.g., such as digital imaging used for laser beam optical tracking feature), RF tag detection, wireless RF communications with remote systems (e.g., other cameras, enterprise IT equipment, or directly to remote viewers located within the venue such as hand held wireless devices held by venue attendees).

Referring again to FIG. 10, slave cameras 212-215 can be set up to be focused towards the same general area at the center of the ring as the main camera 211. Referring to FIG. 12, a slave camera 212 can be mounted to hardware such as posts 217 located at corners of the close-in area 210. After initial set up, the main camera 211 can be moved by remote control to several points around the environment, such as each corner of the boxing ring.

Referring again to FIG. 10, during operation slave cameras 212-215 would also move to each point that the main camera 210 is moved to. During movements of the main and slave cameras, a computer can tract x, y, z readings from each camera for each location. The process is continued until all cameras in the system are calibrated for synchronized movement to the same locations in the boxing ring. During operation, all slave cameras 212-215 can move around at the direction of the main camera 211. Alternatively, the main camera 211 and all slave cameras 212-215 can be moved around at the direction of an operator by remote control based on camera reading stored by the computer.

As an alternate embodiment, it can be appreciated by those skilled in the optical arts that technology now allows for system to coordinate movement based on optical tracking. If optical tracking is used for the synchronized camera system, then it should be appreciated that the main camera 211 would likely transmit an optical light beam, such a laser beam, towards the target (e.g., boxers in a boxing ring). Slave camera movement would be based on movement of the optical beam sent by the main camera 211. Slave camera 212-215 would include beam tracking technology, which can be provided in the form of a detector or image processing filter that would allow the slave cameras 212-215 to identify the light bean being transmitted by the main camera 211. Use of beam tracking technology would overcome the need for calibration as previously described; however, movement of all cameras will always dependent on the main cameras.

As another alternate embodiment, is can be appreciated by those skilled in the radio frequency tagging art that RF tagging technology can be used to control the movement of synchronized cameras in a close-in environment, such as a boxing ring. With RF tagging, RF tags can be assigned to each boxer for placement in a non-inhibiting manner. Given the advances in the RF tag art, RF tags are so small that one or more RF tags could be placed on a boxer's belt, glove, shoe, or even a mouthpiece. The RF tags can be placed on both boxers and transmit the same or different signals for each respective boxer. Main and slave cameras can include RF tag detectors that are adapted to detect the RF tags and track the signal during movement. Camera can be split between boxers so that each boxer's image is captured during movement in the boxing ring. The RF receivers would sense signal strength and direction and move to the general area in the environment of assigned RF signal transmission.

Alternatively, a grid of receivers can be deployed beneath the floor of the environment to track the strongest broadcast of RF tag signals above the floor. Information regarding signal strength and associated location can be managed by a server or computer in control of the cameras x, y, z orientation, or each camera can have on-board receivers and controllers that can electromechanically adjust the argument of each cameras based on received signal data.

It should be appreciated that remote viewers/devices that take advantage of synchronized camera views can not only include venue-based hand held devices but can include distant monitors such as high definition television (HDTV) systems, or other digital enabled viewing systems and devices used for entertainment purposes.

Referring to FIG. 13 Camera views can be captured by more than camera deployed about and/or surrounding a close-in activity arena 310. Camera views can be provided from the synchronized video perspectives from cameras transmitted to a venue based router 131. Thereafter, the camera views can be processed in a server 332 for broadcast to remote video monitors. Remote viewers can include hand held devices 333 and digital entertainment monitors 338 (e.g., HDTV).

Within a venue, the camera views can be processed and formatted for display on display screens associated with venue-based hand held device 333. A user can select from more than one view provided from the synchronized camera system that the user wants displayed on the handheld device 333, thereby enabling a user of the remote viewer to view more than one camera view, one at a time or simultaneously. The camera views can be transmitted from at least one camera to the hand held device in response to a user input and/or selection as described in detail hereinbefore. In addition, a particular camera view transmitted from at least one camera can be digital recorded by an enterprise system for instant replay, by the enterprise system or at the handheld device 1330 in response to a user input at the remote viewer.

As further shown in FIG. 13, broadcasted camera views, including in-play camera views, can be carried out in the venues from the servers 332 using various broadcast signal transmissions. Examples of wireless RF transmissions include digital WiFi utilizing wireless access points in a venue 332, digital cellular-subscriber transmission 336, satellite television broadcast services 338, and cable television broadcast services 337. Data representing multi synchronized video perspectives views can be displayed on remote video monitors after transmission through data network 334 for further processing by subscription services (e.g., digital cable television and satellite television providers).

Methods and systems for transmitting and displaying venue-based synchronized camera views for live venue activities to remote views are therefore disclosed herein, with respect to particular embodiments. The synchronized camera can include a main camera and at least one slave camera, such that the movement of the slave camera is dependent on movement by the main or primary camera. View(s) captured by the slave camera are of the same general target as those captured by the main camera. Remote video monitors can be venue-based hand held devices or distant monitors. Camera views can be captured by more than synchronized camera deployed around a contact sports arena, such as a boxing or wresting ring. Camera views can be provided from the synchronized cameras to a venue based server where the camera views are processed for broadcast to remote viewers. Remote viewers can include hand held devices and digital entertainment monitors (e.g., HDTV).

Within a venue, the camera views can be processed and formatted for display on display screens associated with venue-based hand held device. A user can select from more than one view from the synchronized camera that the user wants displayed on the remote viewer, thereby enabling a user of the hand held device to view more than one camera view, at a time or simultaneously, through the remote viewer. The in-play camera view can be transmitted from at least one camera to the hand held device in response to a user input and/or selection. In addition, a particular in-play camera view transmitted from at least one camera can be digital recorded by an enterprise system for instant replays or in response to a user input at the remote viewer.

Figure 14:
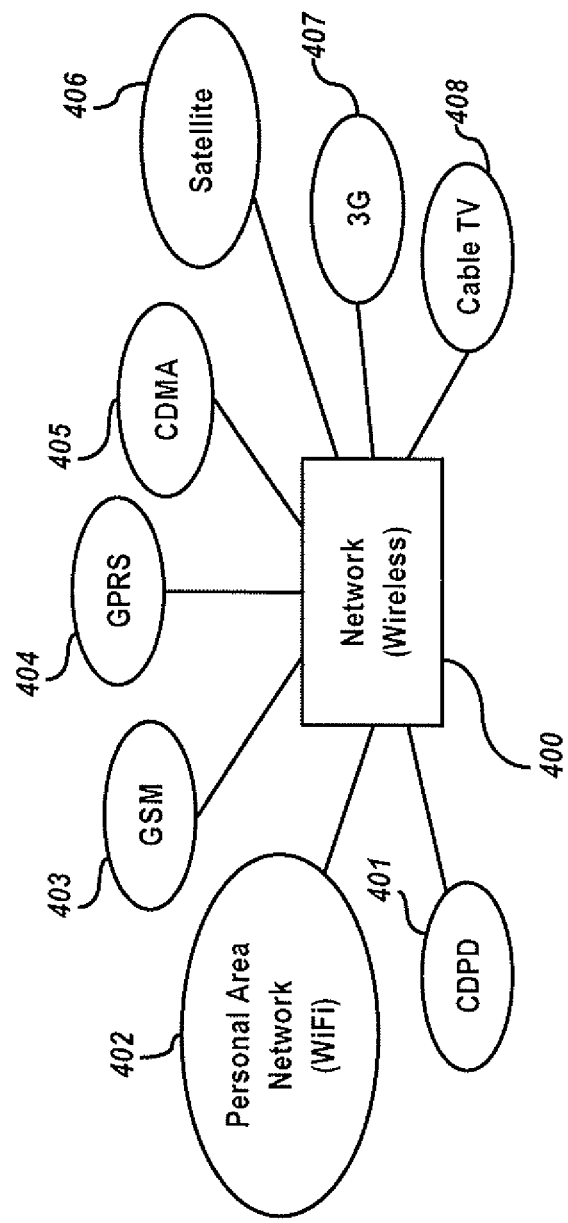
FIG. 14 illustrates a diagram depicting various broadcast networks that can be utilized to broadcast video perspectives in accordance with embodiments of the present invention.

FIG. 14 illustrates an entity diagram depicting network attributes of broadcast networks 400 that can be utilized in accordance with embodiments of the present invention. A Broadcast networks 400 as illustrated in FIG. 14 can be configured as a variety of possible wireless networks, satellite broadcast networks and cable broadcast networks. Thus, entity diagram illustrates attributes of wireless network 400, which can, or do not have to, be exclusive of one another.

Those skilled in the art can appreciate that a variety of possible wireless communications and networking configurations can be utilized to implement broadcast network 400. Broadcast network 400 can be, for example, implemented according to a variety of wireless protocols, including cellular, Bluetooth, and 802.11 RF or direct IR communications. Broadcast network 400 can be implemented as a single network type or a network based on a combination of network types (e.g., Bluetooth, CDMA, etc).

Broadcast network 400 can be configured with teachings/ aspects of CDPD (Cellular Digital Packet Data) networks well known in the networking arts. CDPD network 401 is illustrated in FIG. 14. CDPD can be configured as a TCP/IP based technology that supports Point-to-Point (PPP) or Serial Line Internet Protocol (SLIP) wireless connections to mobile devices, such as the hand held devices described and illustrated herein. Mobility and/or cellular service are generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Broadcast network 400 can preferably be also configured with teachings/aspects of a Personal Area Network 402, such as WiFi (802.11) or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein. Note that "WiFi" is an acronym for the term Wireless Fidelity. WiFi is known as wireless local area network operating generally in a license free ISM 2.4 GHz band. This network is generally defined by the standard IEEE 802.11 of indoor wireless LANs. WiFi essentially refers to a compatibility and interoperability between different devices and systems that are able to pass appropriate tests. Devices in a WiFi network can communicate within a wireless cell with a radius of, for example, approximately 150 meters in free space. Bandwidth available on a channel can be shared by all stations within a wireless cell. WiFi networks are ideal for high speed access to the Internet via public places referred to as "wireless hotspots". Devices that are based on the IEEE 802.11b standard, for example, can also be adapted for use in outdoor applications. With a higher output power and one or more associated external antennas, the range of WiFi network can be extended up to several kilometers.

Broadcast network 400 can also be configured utilizing teachings/aspects of GSM network 403. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Broadcast network 400 can also utilize teachings/aspects of GPRS network 174. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Broadcast network 400 can also be implemented utilizing teaching/aspects of a CDMA network 405 or CDMA networks. CDMA (Code Division Multiple Access) is a protocol standard, also referred to frequently in the telecommunications arts as CDMA-x. CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at great speeds. Broadcast network 400 can also be configured with a form of CDMA technology known as wideband CDMA (W-CDMA). Wideband CDMA can be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Broadcast network 400 can be also implemented utilizing teachings/aspects of satellite broadcast network 406. Such satellite networks, well known in the multimedia broadcast services arts, can be implemented in accordance with the present invention to enable transmission or receipt of broadcasted video data.

Broadcast network 400 can also be configured utilizing teachings/aspects of 3G networks 407.

Broadcast network 400 can be also implemented utilizing teachings/aspects of cable television broadcast network 408. Such cable networks are well known in the multimedia broadcast services arts, can be implemented in accordance with the present invention to enable transmission or receipt of broadcasted video data.

When remote video monitors are provided in the form of wireless hand held devices themselves can be provided as proprietary devices owned by promoters or operators of stadium venues and rented to patrons for their use while attending a venue activity. Proprietary devices will generally be manufactured using durable materials (e.g., similar to those materials used on field technician digital multimeters/devices such as the Fluke™ line of electronic devices). Proprietary devices will also be limited in hardware and software modules (i.e., software routines/subroutines) needed for communication with the venue system in order to display venue activities to temporary users.

Hand held devices can also be owned by the patrons themselves that they bring into the stadium venue for their use by permission of the venue promoter or stadium owners in return for the payment of a fee by the patron. In return for the fee, the venue promoter or stadium owner can provide the patron with a temporary code, which permits them to access, the wireless transmissions network and associated with the venue itself, such as broadcast networks 400 described herein. Patron-owned devices can utilize modules (e.g., smart card technology to receive authorization (e.g., frequency or codes) needed to receive venue-provided video/data. Authorization can also be transferred to the patron-owned device via IR or short-range RF means. Wireless networks as described herein can be configured as a proprietary wireless Intranet/internet providing other data accessible by patrons through their hand held devices.

Figure 15:
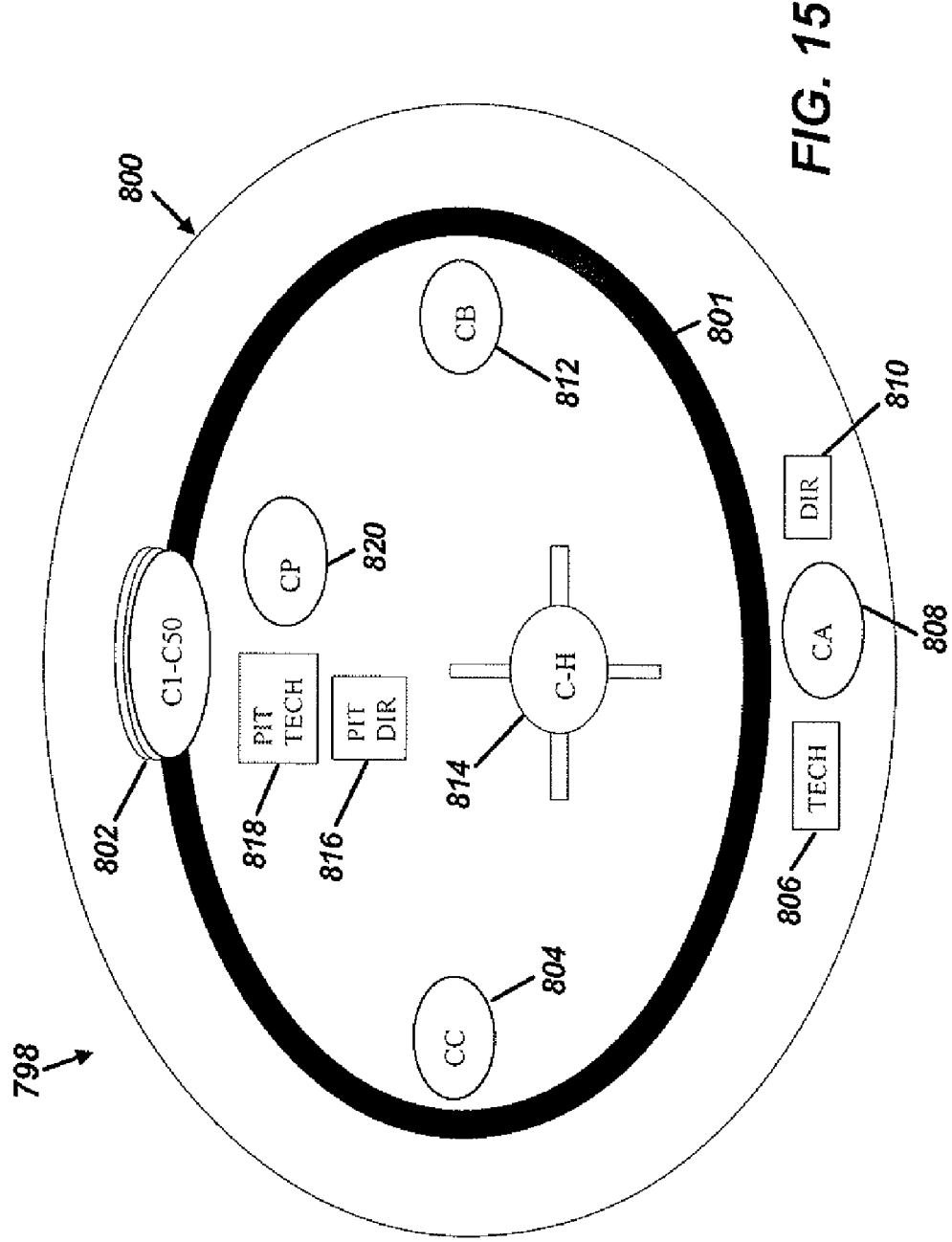
FIG. 15 depicts a block diagram illustrative of a racetrack deployment, which can be implemented in accordance with an embodiment of the present invention.

FIG. 15 depicts a block diagram 798 illustrative of a race-track deployment of multimedia solutions, which can be implemented in accordance with an embodiment of the present invention. Generally, a racetrack 801 can be configured within a racing venue or racing stadium. An example of a racetrack in which the present invention disclosed herein can be implemented is a NASCAR® racing stadium. NASCAR® is a registered trademark of the National Association for Stock Car Auto Racing, Inc., P.O. Box 2875, Daytona Beach, Fla. 32120-2875.

In accordance with the methods and system of the present invention, vehicle "in-play" cameras can be located within vehicles C1 to C50, as indicated at block 802. Such in-play cameras can provide data wireless through communication means already discussed herein. A main camera perspective can be provided by camera 808 (i.e., CA), A first turn perspective can be provided by camera 812 (i.e., CB). Additionally, a second turn perspective can be provided by camera 804 (i.e., CC). A PIT camera 820 (i.e., CP) can also provide a racing pit perspective. A helicopter camera 814 (i.e., C-H) can also be positioned within a helicopter flaying above stadium 800.

Figure 16:
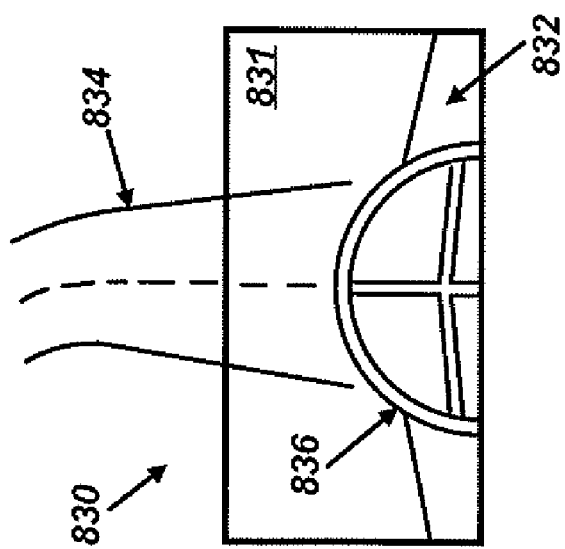
FIG. 16 illustrates a pictorial diagram of an in-play camera view of a racetrack deployment, which can be implemented in accordance with an embodiment of the present invention.

A system technician 806 (i.e., TECH) can work in concert with a director 810 (i.e., DIR). Director 810 is generally a media/technical director. A pit technician 818 (i.e., PIT TECH) can be located near a bit director 816 (i.e., PIT DIR). The following index summarizes the roles of various cameras and individuals indicated in FIG. 22:

C1-C50—Vehicle "In-play" Cameras
    CA—Main Camera Perspective
    CB—First Turn Perspective
    CC—Second Turn Perspective
    CP—PIT Camera
    C-H—Helicopter Camera
    TECH—System technician
    PIT TECH—Pit technician
    DIR—Media/Technical Director
    PIT DIR—Pit Director FIG. 16 illustrates a pictorial diagram 830 of an in-play camera view of a racetrack deployment, which can be implemented in accordance with an embodiment of the present invention. Such an in-play camera view can be obtained from a camera located within a racing car within stadium 800 of FIG. 15. Examples of such racing cars are illustrated in FIG. 15 at block 802 (i.e., racing cars C1 to C50). As depicted in FIG. 16, the driver of a racing car can view a racing track 834 (i.e., a view of track 801 of FIG. 15) through a car window 831. The driver can generally view a racing car dashboard 832 and steering wheel 836. Such a view can be broadcast real-time via a camera located within the racing car. Such a view can be broadcast real-time and transmitted from the camera located within the racing car through a wireless communications network to a remote video monitor 838, which is illustrated in FIG. 17.

Figure 17:
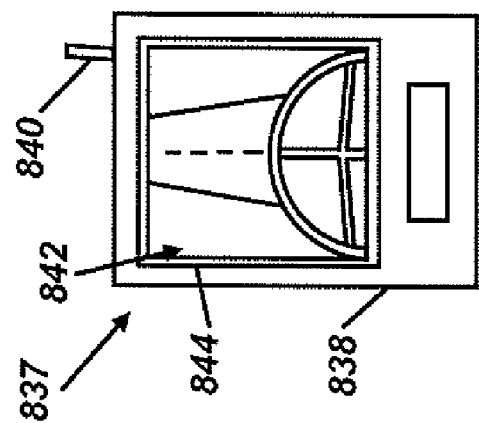
FIG. 17 depicts a pictorial view of a remote video monitor including a display area having an in-play view of the racetrack deployment indicated in FIG. 15, in accordance with an embodiment of the present invention.
Figure 23:
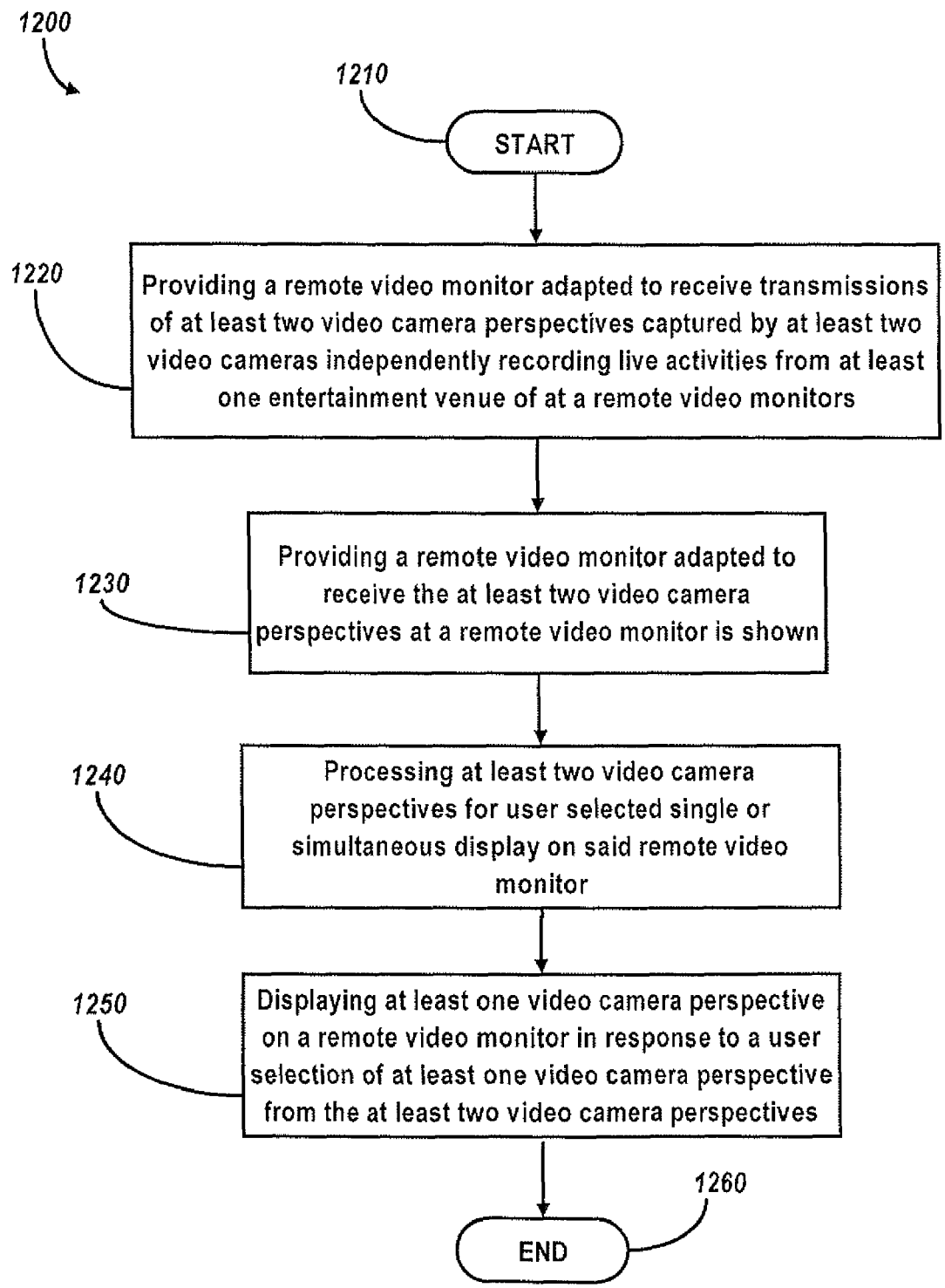
FIG. 23 depicts a flowchart of operations of a method for a remote video monitor adapted receiver, process and display with respect to an entertainment venue, in accordance with the disclosed embodiments.

FIG. 17 depicts a pictorial view 837 of remote video monitor 838 and a display area 844 having an in-play view of the racetrack deployment indicated in FIG. 15, in accordance with an embodiment of the present invention. Remote video monitor 838 is analogous to remote video monitors illustrated in FIGS. 2 and 3 herein. Remote video monitor 838 of FIG. 17 is also analogous to remote video monitor 60 of FIGS. 4 to 9 herein. Hand held device 838 can receive and transmit data to and from a wireless communications network, such as, for example, network 152, which is depicted in FIG. 10 herein. Thus, the in-play camera view obtained from racing cameras, such as indicated in FIG. 23, can be transmitted through a wireless communications network real-time to hand held device 838 and displayed on display area 844 for a user of the hand held device 838 to view.

Remote video monitor 838 when provided in the format of a Hand held device can also generally include an antenna 840. Those skilled in the art can appreciate that antenna 840 can be integrated within hand held device 838 and can be presented as an external attachment or appendage to hand held device 838 for illustrative purposes only. View 842 displayed within display area 844 can thus be obtained from a camera positioned within a racing car, as indicated in FIGS. 16 and 17. Hand held device 838 can be configured to include video recording capabilities. Thus, a user of had held device 838 can desire to record a video perspective obtained by a camera included in the hand held device for storage in the device or transmission through data networks.

Thus, in-play camera views can be wirelessly transmitted from at least one camera located at an in-play location within a venue (e.g., a racing venue) to enterprise equipment, wherein the views can then be processed for display on a display screen associated with hand held devices. It should be appreciated by those skilled in the art that camera views can also be transmitted for receipt directly by hand held devices. Thereafter, the in-play camera view can be displayed on the display screen, thereby enabling a user of the hand held device to view the in-play camera view through a hand held device.

Figure 18:
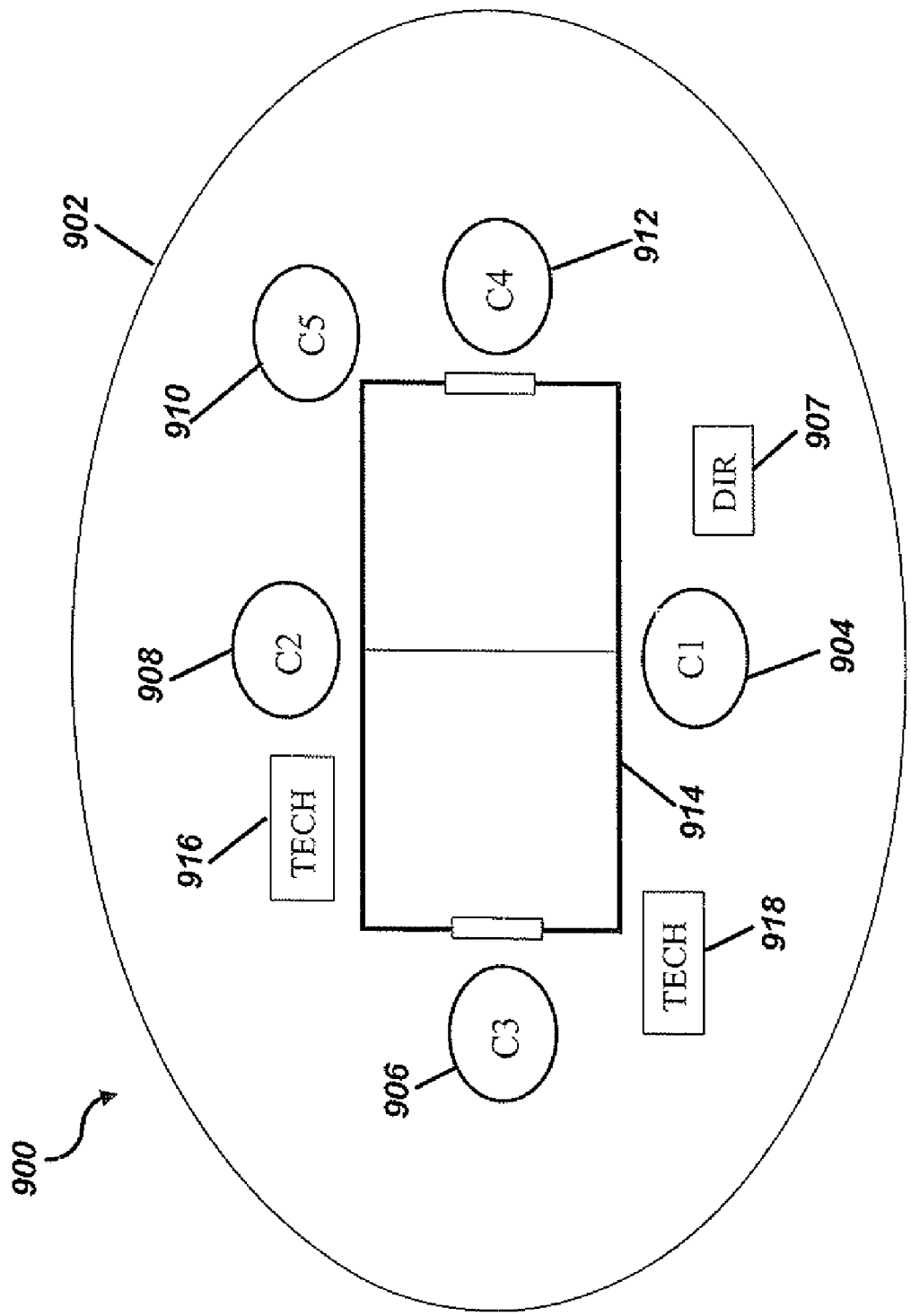
FIG. 18 illustrates a block diagram illustrative of a sports venue deployment, which can be implemented in accordance with an alternative embodiment of the present invention.

The in-play camera view can be transmitted from enterprise equipment and/or at least one camera to the hand held device in response to a particular user input and/or selection. In addition, a particular in-play camera view transmitted from at least one camera can be recorded, in response to a particular user input. Such in-play camera views can also be stored in a memory associated with the hand held device or within storage media (e.g., a memory stick or memory disk or other storage media), in response to a particular input and/or selection. Although the in-play camera location can comprise, for example, a placement within at least one racing car competing within a racing venue, it should be appreciated form the foregoing disclosure that the in-play camera can be utilized in other venue related applications, such as, for example, horse racing, football, soccer, etc. For example, an in-play camera can be integrated with a helmet or other equipment associated with the activity. Video obtained from such in-play cameras FIG. 18 illustrates a block diagram 900 illustrative of a sports venue deployment, which can be implemented in accordance with an alternative embodiment of the present invention. A sports stadium 902 includes a playing field 914 about which various cameras can be positioned to obtain perspective video views for broadcast to wireless hand held devices located within the stadium or outside of the stadium. Camera 904 (i.e. C1) can provide a main center camera perspective. Camera 908 (i.e., C2) can provide an opposite center perspective (i.e., opposite camera 904). Camera 906 (i.e., C3) can provide a home team goal view. Camera 912 (i.e., C4) can provide a visiting team goal view.

Figure 19:
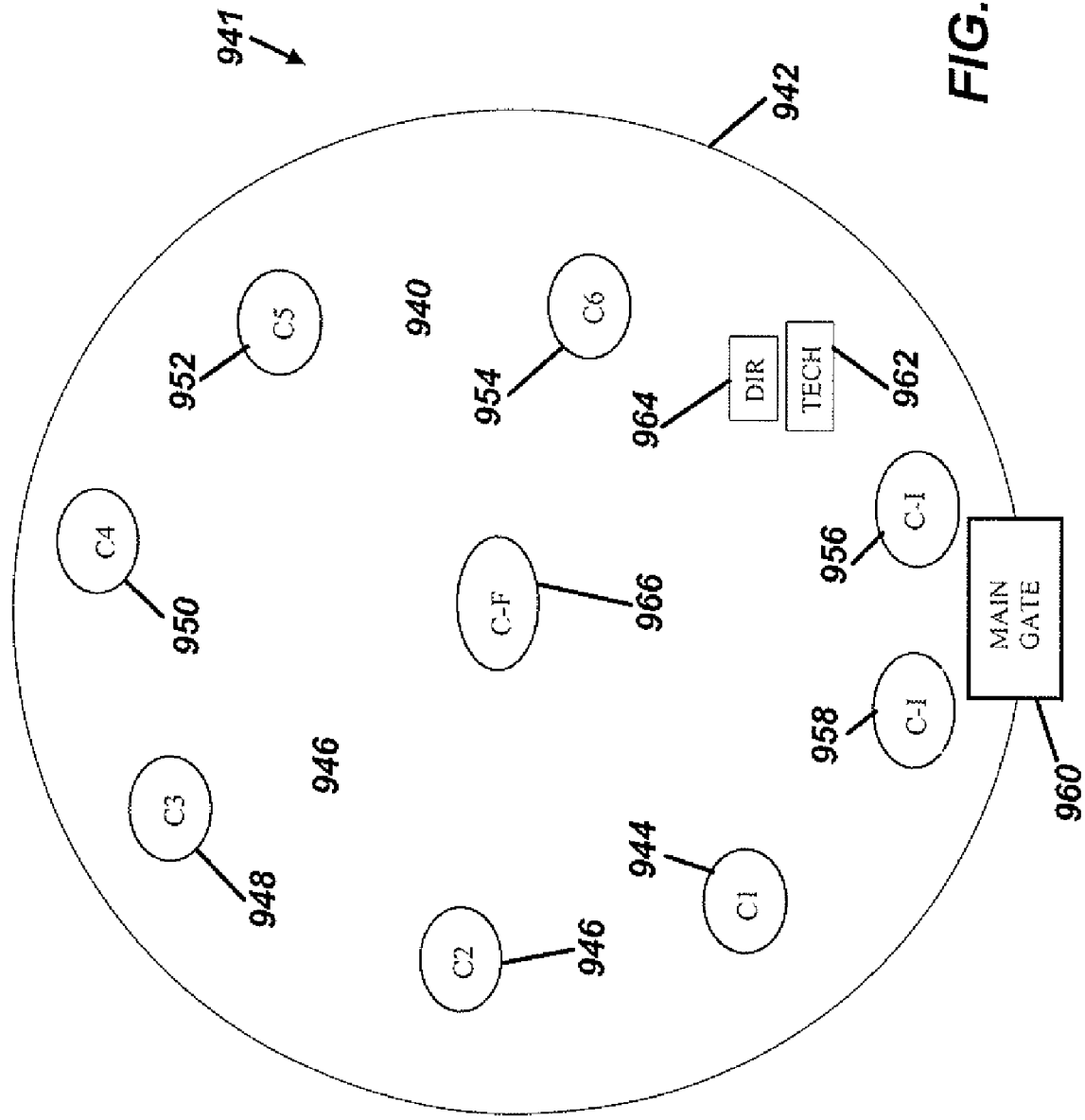
FIG. 19 depicts a block diagram illustrative of a village deployment, which can be implemented in accordance with an alternative embodiment of the present invention.

Camera 910 (i.e., C4) can provide a roaming "fan CAM" view. A systems technician 918 (i.e., TECH) can function in concert with a media/technical director (i.e., DIR) 907. Cameras C1 to C5 indicated in FIG. 25 thus generally can comprise in-play cameras. Video obtained from such in-play cameras can be transmitted from such in-play cameras for display on a display associated with a hand held device. The following generally summarizes the deployment illustrated in FIG. 25:

C1—Main Center Camera Perspective
    C2—Opposite Center Perspective
    C3—Home Team Goal View
    C4—Visiting Team Goal View
    C5—Roaming "Fan CAM"
    TECH—System technicians p1 DIR—Media/Technical Director FIG. 19 depicts a block diagram 941 illustrative of a village 942 deployment, which can be implemented in accordance with an alternative embodiment of the present invention. An example of a "village" is an amusement park, entertainment complex or golf course, wherein the real estate hosting entertainment activities is large and terrain varied. As illustrated in FIG. 19, cameras 944, 946, 948, 950, 952, and 954 (i.e., cameras C1 to C6) can provide activity/show perspectives. Cameras 958 and 956 (i.e., C-I) can provide INFO channels which can broadcast particular village information for display on a remote video monitors, such as, for example, hand held device 838 discussed earlier.

Village 942 can include a main gate 960 through which village attendees can pass prior to entry to village 942. One or more system technicians 962 (TECH) can be located within village 942 to work in concert with a media/technical director 964 (i.e., DIR). One or more roaming "Fan CAM" cameras 966 (i.e., Fan CAM) can also be located within village 942 to provide roaming video views which can be picked up by hand held devices in communication with a wireless communications network associated with village 941. Cameras C-1, C-F and C1 to C6 illustrated in FIG. 19 thus generally can comprise in-play cameras. Video obtained from such in-play cameras can be transmitted from such in-play cameras for display at one or more hand held devices. The following generally summarizes the deployment illustrated in FIG. 19:

C-I—INFO Channels
C1-C6—Activity/Show Perspectives
C-F—Roaming "Fan CAM"
TECH—System technicians
DIR—Media/Technical Director It should be appreciated that village 42 can also include or be implemented as a golf course. The main gate 960 through which golf attendees can pass prior to entry to golf course 942 can include a clubhouse, pro-shop or other facilities, such as those available at typical country clubs. One or more system technicians 962 (TECH) can be located within golf course 942 to work in concert with a media/technical director 964 (i.e., DIR). One or more roaming "Fan CAM" cameras 966 (i.e., Fan CAM) can also be located within golf course 942 to provide roaming video views of attendees at a tournament, views which can be picked up by remote viewers in communication with a wireless communications network associated with village 941.

Cameras C-1, C-F and C1 to C6 illustrated in FIG. 19 can be implemented as in-play cameras assigned to specific championship golfers, which would allow viewing fans to monitor more than one pro golfer at a time user a remote viewer. It should be appreciated that more than one in-play camera can be used in a golf course or golf course event. Eighteen in-play cameras can be assigned to each hole at an event. Or one in-play camera can be assigned to each pro golfer. Thirty six cameras can be deployed, for example, one at the "tee-box" area and another near the "putting green" for each hole.

All video obtained from the cameras, including in-play cameras, can be assigned a unique channel, which can be received directly from remote video monitors (e.g., PDAs, cellular telephones, HDTV, etc.) having complimentary RF receivers, or the camera signals can be m received and managed by a server prior to rebroadcast. Upon rebroadcast, each camera can be assigned a unique frequency or IP address for data management purposes and for ease of identification and assignment when received by remote viewers, enabling users to easily find and select camera view for viewing. Rebroadcast can be transmitted from such in-play cameras for display at one or more hand held devices.

Figure 20:
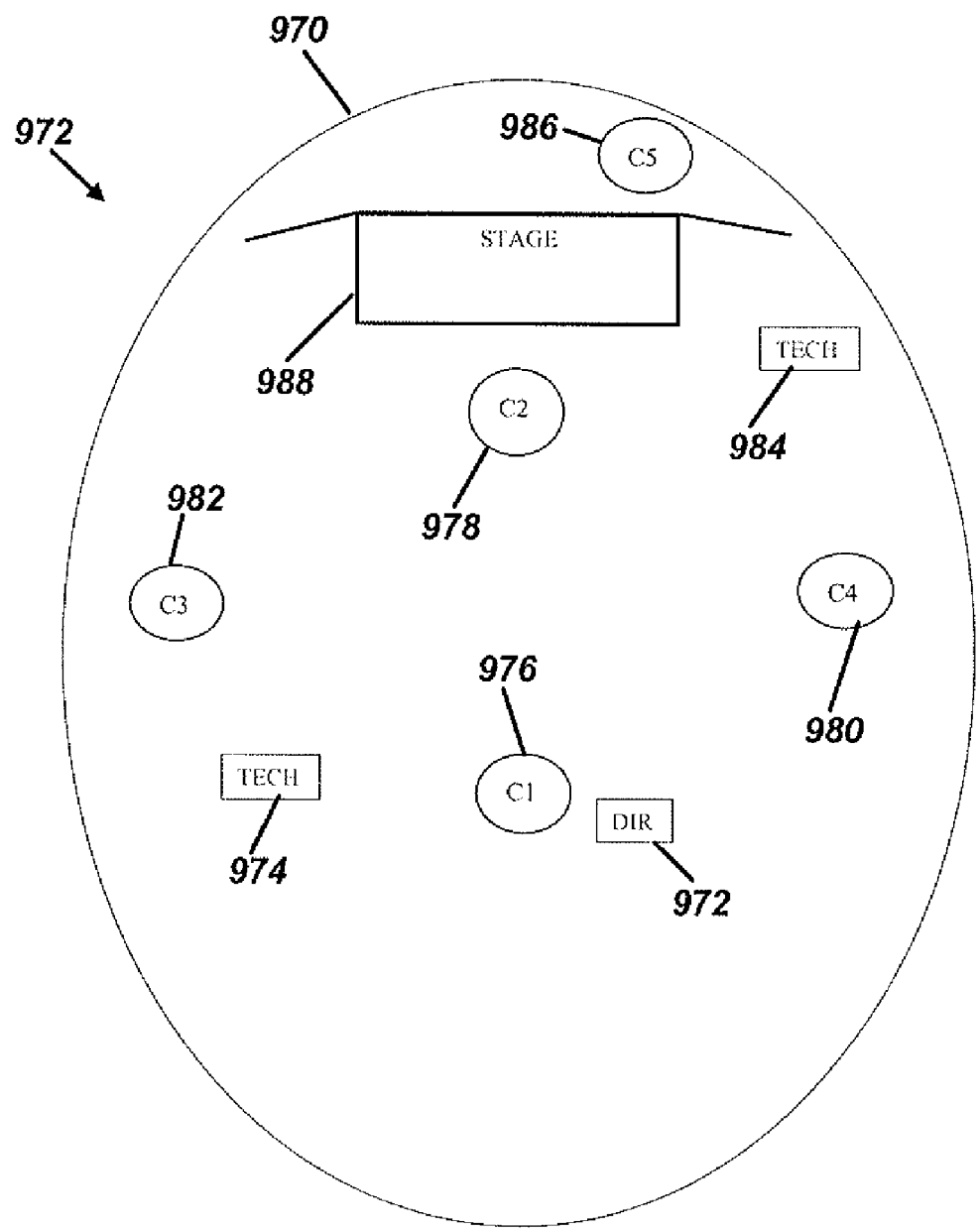
FIG. 20 illustrates a block diagram of a concert deployment, which can be implemented in accordance with an alternative embodiment of the present invention.

FIG. 20 illustrates a block diagram 972 of a concert deployment, which can be implemented in accordance with an alternative embodiment of the present invention. FIG. 20 depicts a concert arena 970, which includes a stage 988. A camera 976 (i.e., C1) can provide a main camera perspective. A camera 978 (i.e., C2) can provide close up perspectives of the events taking place on stage 988. Camera 982 (i.e., C3) can provide a left view of the events taking place on stage 988. Camera 980 (i.e., C4) can provide a right view of the events taking place on stage 988.

A backstage camera 986 (i.e., C5) can also provide backstage views of the events taking place on stage 988. A systems technician 974 (i.e., TECH) can also work in concert with a media/technical director 972 (i.e., DIR). Cameras C1 to C5 depicted in FIG. 20 thus generally can comprise in-play cameras. Video obtained from such in-play cameras can be transmitted from such in-play cameras for display at one or more hand held devices. The following generally summarizes the deployment illustrated in FIG. 20.

C1—Main Camera Perspective
C2—Close UP Perspectives
C3—Left View
C4—Right View
C5—Backstage Camera
TECH—System technicians
DIR—Media/Technical Director A remote video monitor 60 (e.g., hand held device) can be equipped with receivers that can receive data transmitted from one or more data source(s) (e.g., RF gateways, video cameras, etc.) within or outside of live entertainment venues. Such remote video monitors can be wireless-enabled and can take the form of a wireless PDA, proprietary rentals, or the like. The remote video monitors can be adapted to receive smart cards, or the like, that can enable receipt of venue data (e.g., receivers and/or authorization codes being held within the smart card or module to enable signal decryption).

A venue-based data source can be a video camera, server or private broadcasting system. Video cameras can be adapted to provide high-resolution wide-angle video data. The video camera can also be a wireless video camera. It can be appreciated that a hand held device, as described herein, can also be configured to include video cameras which can record and broadcast video. In such a situation, the hand held device can actually function as an in-play camera (i.e., if the hand held device is configured with video camera and video transmission capabilities).

The concert arena or stadium can also be equipped with one or more transmitters. For example, several wireless gateways or signal transponders can be located throughout a venue to enable the simplex or duplex transfer of data. Examples of wireless networks that can be utilized in association with the present invention are the well-known local area "Bluetooth" and "802.11" networks, and telecommunications networks such as CDMA, W-CDMA, GSM, etc. It should be appreciated that remote viewers/devices that take advantage of in-play camera views can not only include venue-based hand held devices but can include distant monitors.

Figure 21:
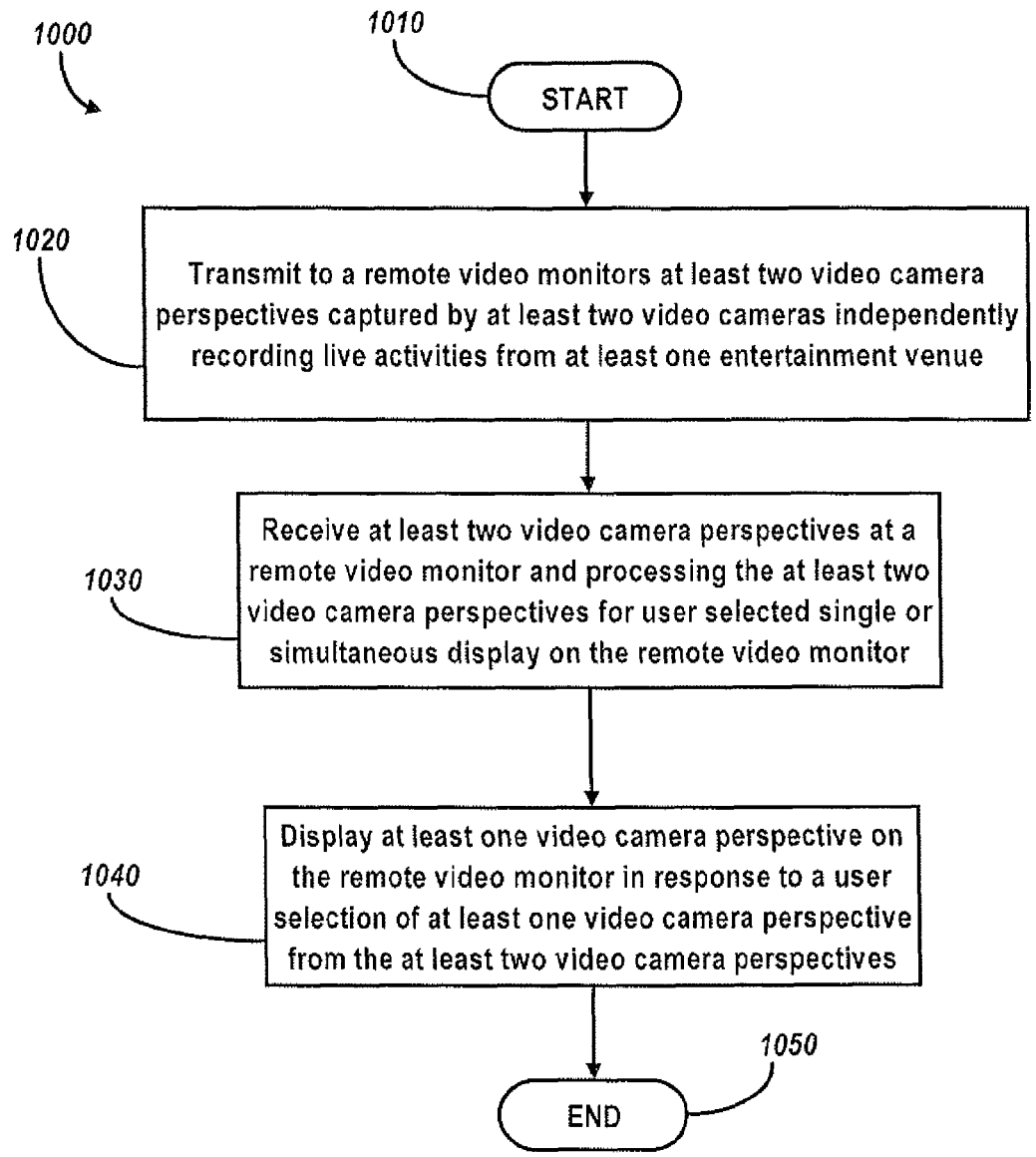
FIG. 21 depicts a flowchart of operations illustrative of a method for providing video perspectives of multiple venue activities through a remote video monitor in accordance with embodiments of the present invention.

FIG. 21 depicts a flowchart 1000 of operations for providing video camera perspectives recorded from live activities at entertainment venues for display at a remote video monitors. The process begins at block 1010. At block 1020, a step of transmitting at least two video camera perspectives captured by at least two video cameras independently recording live activities from at least one entertainment venue to remote video monitors is provided. Then at block 1030, the at least two video camera perspectives are received at a remote video monitor and processed for user selected single or simultaneous display on the remote video monitor. At block 1040, at least one video camera perspective is displayed at the remote video monitor in response to a user selection of said at least one video camera perspective from the at least two video camera perspectives. The process then ends as shown at block 1050.

Figure 22:
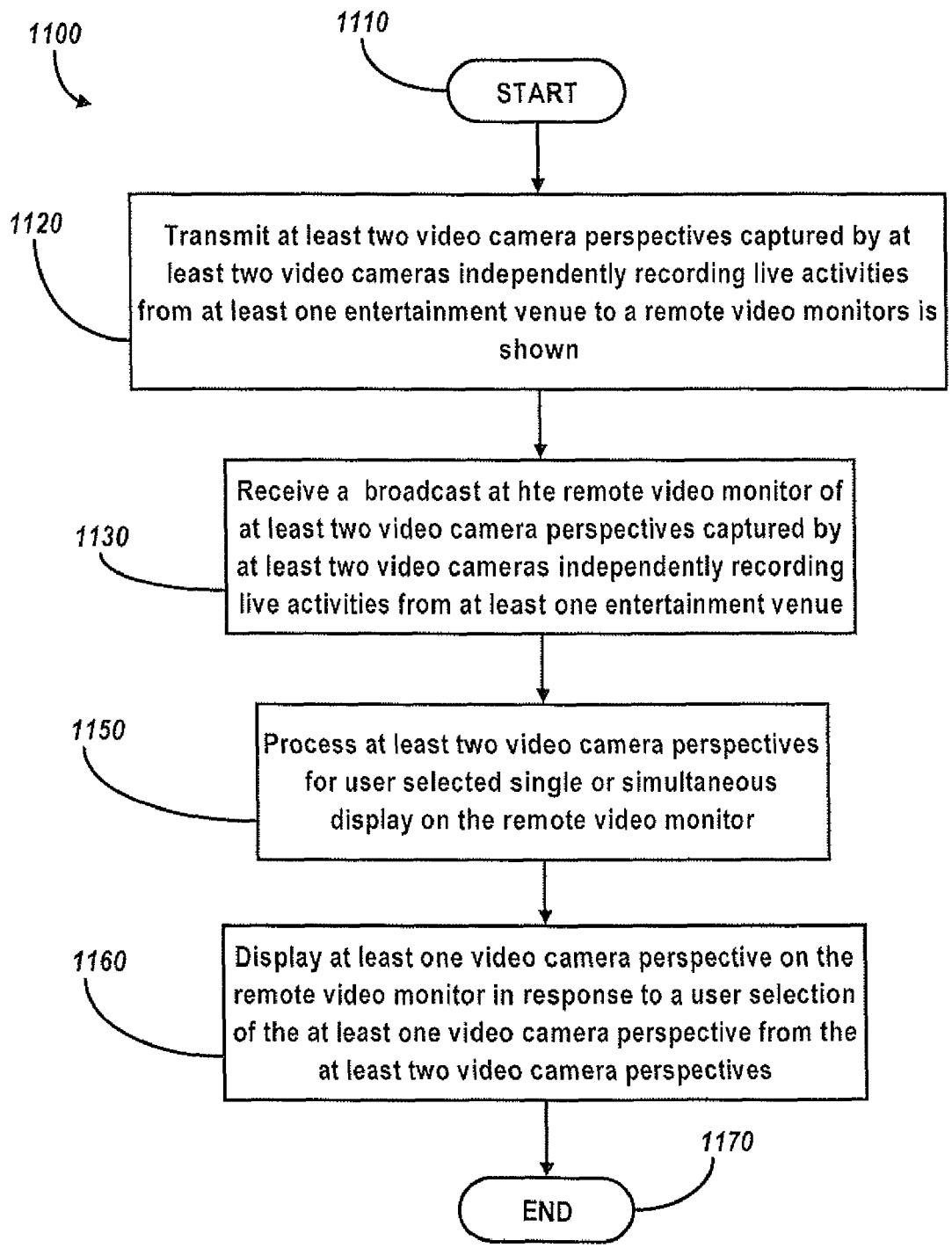
FIG. 22 illustrates a flowchart of operations illustrative of a method for providing video perspectives of multiple venue activities through a remote video monitor from one or more digital video cameras in accordance with embodiments of the present invention.

FIG. 22 depicts a flowchart 1100 of methods steps for providing video camera perspectives recorded from live activities at entertainment venues for display at a remote video monitors. The process begins at block 1110. At block 1120, a step of transmitting at least two video camera perspectives captured by at least two video cameras independently recording live activities from at least one entertainment venue to a remote video monitors is shown. Then at block 1030, a remote video monitor broadcasting of at least two video camera perspectives captured by at least two video cameras independently recording live activities from at least one entertainment venue is received. At block 1040, at least two video camera perspectives are processed for user selected single or simultaneous display on said remote video monitor. Then at block 1050, at least one video camera perspective is displayed on said remote video monitor in response to a user selection of said at least one video camera perspective from the at least two video camera perspectives. The process then ends as shown at block 1060.

FIG. 23 depicts a flowchart 1200 of methods steps for providing a remote video monitor adapted receiver, process and display from entertainment venue. The process begins at block 1210. At block 1220, a step is illustrated for providing a remote video monitor adapted to receive transmissions at least two video camera perspectives captured by at least two video cameras independently recording live activities from at least one entertainment venue of at a remote video monitors. Then at block 1230, the step of providing a remote video monitor adapted to receive the at least two video camera perspectives at a remote video monitor is shown. At block 1240, at least two video camera perspectives are processed for user selected single or simultaneous display on said remote video monitor. Then as show in block 1250, at least one video camera perspective is displayed on said remote video monitor in response to a user selection of said at least one video camera perspective from the at least two video camera perspectives. The flowchart then ends at block 1260.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method for providing video camera perspectives recorded from live activities at entertainment venues for display as video entertainment offered to customers located within the entertainment venue and also to remote customers located in homes and businesses located away from the entertainment venue, said camera views provided over a data network at remote video monitors, said method comprising the steps of:

transmitting to remote video monitors located within the entertainment venue and also to remote customers located in homes and businesses located away from the entertainment venue at least two video camera perspectives captured by at least two video cameras independently recording live activities from at least one entertainment venue;

receiving said at least two video camera perspectives at remote video monitors located within the entertainment venue and also to remote customers located in homes and businesses located away from the entertainment venue and processing said at least two video camera perspectives for user selected single or simultaneous display on said remote video monitors; and displaying at least one video camera perspective on said remote video monitors in response to a user selection of said at least one video camera perspective from the at least two video camera perspectives, wherein said at least two video camera perspectives are provided for transmission to said remote video monitors from synchronized cameras recording an activity at one entertainment venue and said at least two video camera perspectives are processed for user selected, simultaneous and synchronized display on said remote video monitors and wherein said synchronized cameras include one master camera located above and near the center of said performance platform and capturing images of live entertainment occurring on said performance platform from above said performance platform and at least one slave camera located proximate to the performance platform for capturing side views of entertainment occurring on said platform and responsive to movement of said one master camera, wherein a movement of said at least one slave camera is dependent on a movement by said master camera to capture a video camera perspective of said activity also being captured as video by said master camera.

2. The method of claim 1 wherein said remote video monitors comprise at least one of: a hand held device and a high definition television.

3. The method of claim 1 wherein said at least two video camera perspectives are provided from activities at more than one entertainment venue.

4. The method of claim 3 wherein said remote video monitors comprise at least one of: a hand held device and a high definition television.

5. The method of claim 1 wherein said at least two video camera perspectives are provided from activities at more than one entertainment venue and said at least two video camera perspectives are processed for user selected simultaneous display on said remote video monitor.

6. The method of claim 5 wherein said remote video monitors comprises at least one of: a hand held device and a high definition television.

7. The method of claim 1 wherein said at least two video camera perspectives comprises at least one instant replay.

8. The method of claim 7 wherein said remote video monitors comprise at least one of: a hand held device and high definition television.

9. The method of claim 1 wherein said at least two video camera perspectives comprise at least one instant replay.

10. The method of claim 9 wherein said remote video monitors comprise at least one of: a hand held device and a high definition television.

11. The method of claim 1 wherein said at least two video camera perspectives comprises at least one instant replay.

12. The method of claim 11 wherein said remote video monitors comprise at least one of: a hand held device and a high definition television.

13. The method of claim 3 wherein said at least two video camera perspectives comprises at least one instant replay.

14. The method of claim 13 wherein said remote video monitors comprise at least one of: a hand held device and a high definition television.

15. A method for providing video camera perspectives recorded from live activities at entertainment venues for display at a remote video monitors used by customers located within the entertainment venue and also to remote customers located in homes and businesses located away from the entertainment venue, said camera views provided over a data network, said method comprising the steps of:

transmitting to a remote video monitors used by customers located within the entertainment venue and also to remote customers located in homes and businesses located away from the entertainment venue at least two video camera perspectives captured by at least two video cameras independently recording live activities from at least one entertainment venue;

receiving at a remote video monitors used by customers located within the entertainment venue and also to remote customers located in homes and businesses located away from the entertainment venue broadcasting of at least two video camera perspectives captured by at least two video cameras independently recording live activities from at least one entertainment venue;

processing said at least two video camera perspectives at the remote video monitors used by customers located within the entertainment venue and also to remote customers located in homes and businesses located away from the entertainment venue for user selected single or simultaneous display on said remote video monitor; and displaying at the remote video monitors used by customers located within the entertainment venue and also to remote customers located in homes and businesses located away from the entertainment venue at least one video camera perspective on said remote video monitor in response to a user selection of said at least one video camera perspective from the at least two video camera perspectives;

wherein said at least two video camera perspectives are provided from activities at more than one entertainment venue and said at least two video camera perspectives are processed for user selected simultaneous display on said remote video monitors;

wherein said synchronized cameras include one master camera and at least one slave camera responsive to movement of said one master camera, wherein a movement of said at least one slave camera is dependent on a movement by said master camera to capture a video camera perspective of said activity also being captured as video by said master camera;

wherein said remote video monitors comprise at least one of: a hand held device and a high definition television wherein said at least two video camera perspectives comprises at least one instant replay.

16. The method of claim 15 wherein said at least two video camera perspectives received by said remote video monitor are further provided from synchronized cameras recording an activity at one entertainment venue and said at least two video camera perspectives are processed for user selected, simultaneous and synchronized display on said remote video monitors.

17. The method of claim 15 wherein said remote video monitors comprise at least one of: a hand held device and a high definition television.

18. A method for providing video camera perspectives recorded from live activities at entertainment venues for display at remote video monitors used by customers located within the entertainment venue and also to remote customers located in homes and businesses located away from the entertainment venue, said camera views provided over a data network, said method comprising the steps of:

receiving at a remote video monitors used by customers located within the entertainment venue and also to remote customers located in homes and businesses located away from the entertainment venue, said camera views provided over a data network at least two video camera perspectives captured by at least two video cameras independently recording live activities from at least one entertainment venue and broadcast by at least one of a satellite television network provider and/or cable television network provider;

processing said at least two video camera perspectives for user selected single display of at least one video camera perspective and user selected simultaneous display of at least two video camera perspectives on said remote video monitors used by customers located within the entertainment venue and also to remote customers located in homes and businesses located away from the entertainment venue, said camera views provided over a data network; and displaying at least one video camera perspective on a flat panel display associated with said remote video monitors used by customers located within the entertainment venue and also to remote customers located in homes and businesses located away from the entertainment venue, said camera views provided over a data network in response to user selection of said at least one video camera perspective from the at least two video camera perspectives;

wherein said at least two video camera perspectives are provided for transmission to said remote video monitor from synchronized cameras recording an activity at one entertainment venue and said at least two video camera perspectives are processed for user selected, simultaneous and synchronized display on said remote video monitors used by customers located within the entertainment venue and also to remote customers located in homes and businesses located away from the entertainment venue, said camera views provided over a data network;

wherein said synchronized cameras include one master camera located above and near the center of said performance platform and capturing images of live entertainment occurring on said performance platform from above said performance platform and at least one slave camera located proximate to the performance platform for capturing side views of entertainment occurring on said platform and responsive to movement of said one master camera, wherein a movement of said at least one slave camera is dependent on a movement by said master camera to capture a video camera perspective of said activity also being captured as video by said master camera.

19. The method of claim 18 wherein said at least two video camera perspectives are further provided from activities at more than one entertainment venue and said at least two video camera perspectives are processed for user selected simultaneous display at said remote video monitors used by customers located within the entertainment venue and also to remote customers located in homes and businesses located away from the entertainment venue, said camera views provided over a data network.

20. The method of claim 18 wherein said remote video monitors comprise at least one of: a hand held device and a high definition television.

21. The method of claim 18 wherein said remote video monitors comprise at least one of: a hand held device and a high definition television.

22. The method of claim 18 wherein said at least two video camera perspectives are provided from activities at more than one entertainment venue.

23. The method of claim 18 wherein said at least one video camera perspective further comprises an instant replay.

24. A method for providing video camera perspectives recorded from live activities at entertainment venues for display at a remote video monitors used by customers located within the entertainment venue and also to remote customers located in homes and businesses located away from the entertainment venue, said camera views provided over a data network, said method comprising the steps of:

transmitting to a remote video monitors used by customers located within the entertainment venue and also to remote customers located in homes and businesses located away from the entertainment venue at least two video camera perspectives captured by at least two video cameras independently recording live activities from at least one entertainment venue;

receiving at a remote video monitors used by customers located within the entertainment venue and also to remote customers located in homes and businesses located away from the entertainment venue broadcasting of at least two video camera perspectives captured by at least two video cameras independently recording live activities from at least one entertainment venue;

processing said at least two video camera perspectives at the remote video monitors used by customers located within the entertainment venue and also to remote customers located in homes and businesses located away from the entertainment venue for user selected single or simultaneous display on said remote video monitor; and displaying at the remote video monitors used by customers located within the entertainment venue and also to remote customers located in homes and businesses located away from the entertainment venue at least one video camera perspective on said remote video monitor in response to a user selection of said at least one video camera perspective from the at least two video camera perspectives, wherein said at least two video camera perspectives are provided from activities at more than one entertainment venue and said at least two video camera perspectives are processed for user selected simultaneous display on said remote video monitors, wherein said synchronized cameras include one master camera and at least one slave camera responsive to a movement of said one master camera, wherein a movement of said at least one slave camera is dependent on a movement by said master camera to capture a video camera perspective of said activity also being captured as video by said master camera.

* * * * *